US010565615B2

(12) United States Patent
Burr et al.

(10) Patent No.: US 10,565,615 B2
(45) Date of Patent: Feb. 18, 2020

(54) SYSTEM AND METHOD FOR PERSONALIZED ADD-ON PURCHASE

(71) Applicant: TRANSFORM SR BRANDS LLC, Hoffman Estates, IL (US)

(72) Inventors: Jonathan R. Burr, Willow Springs, IL (US); Mukund Srinivasan, Palatine, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 14/321,328

(22) Filed: Jul. 1, 2014

(65) Prior Publication Data

US 2016/0005070 A1   Jan. 7, 2016

(51) Int. Cl.
*G06Q 30/02* (2012.01)
*G06Q 30/06* (2012.01)

(52) U.S. Cl.
CPC ..... *G06Q 30/0253* (2013.01); *G06Q 30/0255* (2013.01); *G06Q 30/0631* (2013.01); *G06Q 30/0635* (2013.01)

(58) Field of Classification Search
None
See application file for complete search history.

(56) References Cited

U.S. PATENT DOCUMENTS

| 6,317,722 B1 | 11/2001 | Jacobi et al. |
| 7,756,753 B1* | 7/2010 | McFarland ............ G06Q 30/02 705/26.1 |
| 8,204,799 B1* | 6/2012 | Murray ............... G06Q 10/0835 705/26.81 |
| 8,234,375 B2 | 7/2012 | Ghadialy et al. |
| 8,266,017 B1* | 9/2012 | Dearlove ............... G06Q 30/02 705/26.7 |
| 2003/0065562 A1 | 4/2003 | Matsui et al. |
| 2003/0105682 A1 | 6/2003 | Dicker et al. |
| 2005/0102292 A1* | 5/2005 | Tamayo ............ G06F 17/30539 |
| 2006/0095354 A1* | 5/2006 | Hamzy .................. G06Q 10/08 705/35 |
| 2010/0228628 A1* | 9/2010 | Dufour .................. G06Q 30/02 705/14.53 |
| 2010/0268661 A1 | 10/2010 | Levy et al. |
| 2012/0173335 A1* | 7/2012 | Amzallag .......... G06Q 30/0253 705/14.51 |

(Continued)

OTHER PUBLICATIONS

"How to Add an Item to your Existing Order" (published on Apr. 2, 2014 at https://forums.stevehoffman.tv/threads/amazon-faq-how-to-add-an-item-to-your-existing-open-order.348517/) (Year: 2014).*

(Continued)

*Primary Examiner* — James M Detweiler
(74) *Attorney, Agent, or Firm* — McAndrews, Held & Malloy, Ltd.

(57) ABSTRACT

A system and method for identifying and promoting product items, in which current personal information of a consumer is used to identify and promote additional products items for purchase that have been specifically selected for the consumer at completion of a current order based upon current personal information of the consumer. The recommended product items may then be ordered using information from the completed order.

18 Claims, 18 Drawing Sheets

(56) References Cited

U.S. PATENT DOCUMENTS

| | | | |
|---|---|---|---|
| 2012/0179582 A1* | 7/2012 | Yu ..................... | G06Q 10/083 |
| | | | 705/27.1 |
| 2013/0013448 A1* | 1/2013 | Bradley ............... | G06Q 30/02 |
| | | | 705/26.7 |
| 2013/0041774 A1 | 2/2013 | Emura | |
| 2014/0172736 A1* | 6/2014 | Saha .................. | G06Q 10/083 |
| | | | 705/330 |
| 2015/0142591 A1* | 5/2015 | High ................. | G06Q 30/0613 |
| | | | 705/21 |

OTHER PUBLICATIONS

Extended European Search Report for European Application No. 15174676.5 dated Nov. 2, 2015 (7 pages).
Patent Exam Report for Australian Application No. 2015203641 dated Oct. 13, 2015 (7 pages).
European Patent Office, Communication pursuant to Article 94(3) EPC, in Application No. 15 174 676.5, dated Feb. 2, 2017 (6 pages).
Office Action for European Application No. 15174676.5; dated Feb. 2, 2017 (6 pages).

\* cited by examiner

SYSTEM AND METHOD FOR PERSONALIZED ADD-ON PURCHASE

FIELD

Certain embodiments of the present disclosure relate to systems and methods for processing on-line purchases by consumers. More specifically, certain aspects of the present disclosure relate to systems and methods for identifying and promoting product items, in which current personal information of a consumer is used to identify and promote additional products items for purchase that have been specifically selected for the consumer at completion of a current order based upon current personal information of the consumer. The recommended product items may then be ordered with minimum additional effort on the part of the consumer using information from the completed order. This results in a high likelihood of the recommended product items being of interest to, and therefore being purchased by the consumer.

BACKGROUND

Consumers placing product orders on-line typically select products for addition to a "shopping cart." Once all of the desired products have been identified and added to the "shopping cart," the user may then choose to complete a "checkout" process, during which the consumer provides information regarding order fulfillment and means of payment. The consumer then completes or places the order. Following completion of the order, the consumer typically receives information that confirms completion or placement of the order. The consumer typically must complete the entire product selection and checkout process for each group of product ordered.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method in which current personal information of a consumer is used to identify and promote additional products items for purchase, in which current personal information of a consumer is used to identify and promote additional products items for purchase that have been specifically selected for the consumer at completion of a current order based upon current personal information of the consumer, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
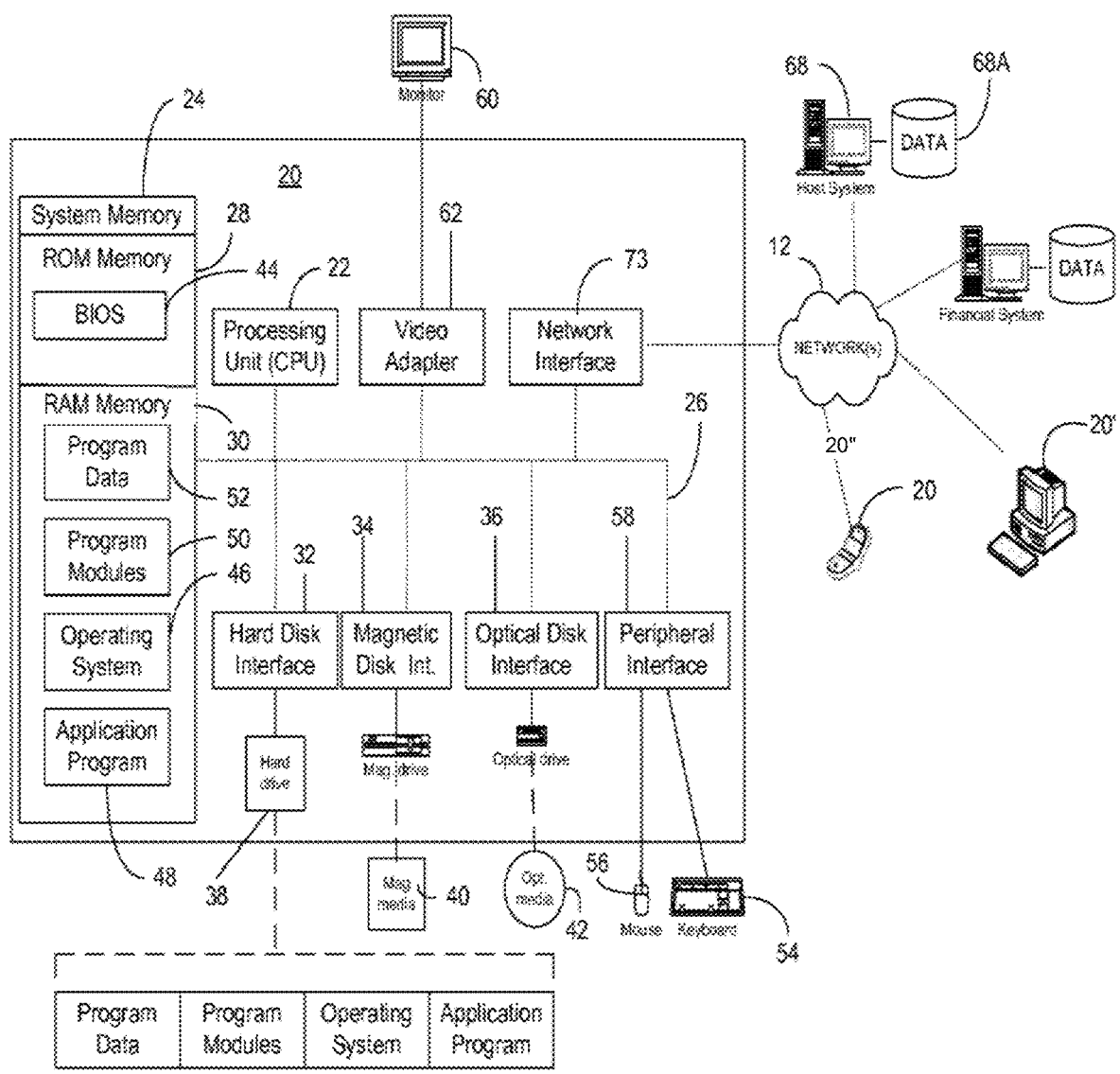
FIG. 1 is an illustration of exemplary computer network in which a representative embodiment of the present disclosure may be practiced.

Aspects of the present disclosure relate to systems and methods for processing on-line purchases by consumers. More specifically, certain aspects of the present disclosure relate to systems and methods for identifying and promoting product items, in which current personal information of a consumer is used to identify and promote additional products items for purchase that have been specifically selected for the consumer at completion of a current order based upon current personal information of the consumer. The recommended product items may then be ordered with minimum additional effort on the part of the consumer, using information from the completed order. This results in a high likelihood of the recommended product items being of interest to, and therefore being purchased by the consumer.

The following description of example methods and apparatus is not intended to limit the scope of the description to the precise form or forms detailed herein. Instead the following description is intended to be illustrative so that others may follow its teachings.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc.

The terms "customer," "consumer," "end-user," and "user" may be used herein interchangeably to refer to a potential or existing purchaser of products and/or services of a business.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network in which a representative embodiment of the present disclosure may be practiced. The following discloses various example systems and methods for, by way of example and not limitation, engaging consumers in a consumer game experience that isolates member preferences and fills in the social graph of the consumer, to aid in the targeting of various forms of content to the consumer. Referring now to FIG. 1, a processing device 20″, illustrated in the exemplary form of a mobile communication device, a processing device 20′, illustrated in the exemplary form of a computer system, and a processing device 20 illustrated in schematic form, are shown. Each of these devices 20, 20′, 20″ are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20′, 20″ illustrated in FIG. 1 may be embodied in any device having the ability to execute instructions such as, by way of example, a personal computer, mainframe computer, personal-digital assistant ("PDA"), cellular telephone, tablet, e-reader, smart phone, or the like. Furthermore, while described and illustrated in the context of a single processing device 20, 20′, 20″, the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, identifying and recommending product items, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present disclosure may be seen in a system or method for identifying and promoting product items, in which current personal information of a consumer is used to identify and promote additional products items for purchase that have been specifically selected for the consumer at completion of a current order based upon current personal information of the consumer. The recommended product items may then be ordered with minimum additional effort on the part of the consumer, using information from the completed order. This results in a high likelihood of the recommended product items being of interest to, and therefore being purchased by the consumer, as further described below.

A representative embodiment of the present disclosure may be employed as part of a shopping and purchase activity of a consumer using an improved version of what may be referred to as a "shopping cart model." For example, while shopping at the web site of an online merchant, a consumer may select products from those items available from the merchant or its business partner(s), and may add various items to the "shopping cart." At some point, the consumer will have added to the shopping cart all of the product items that they wish to purchase, and they may then choose to begin the process of "check out." During the "check-out" process, the consumer may be asked to choose from a number of payments means including, by way of example and not limitation, the use of a credit or debit card; the use of electronic funds transfer (EFT) from a bank or credit union savings or checking account; the use of a secure electronic payment intermediary such as, for example, a PayPal® account; or any form of payment suitable for use with online purchases available now or in the future.

As part of the "check out" process, the consumer may also be asked to choose from a number of fulfillment options including, by way of example and not limitation, "pick-up at store;" "ship-to-store;" "ship-to-drop box," ship via a postal service (e.g., United States Postal Service (USPS)); ship via a commercial air or ground parcel delivery service (e.g., United Parcel Service (UPS), DHL, FedEx), or ship via a commercial transport service (e.g., short or long haul truck) for bulkier items. Depending upon the items selected for purchase by the consumer, not all fulfillment means may be available. For example, some product items may be available for pick-up at a nearby location of the merchant or business partner, and some items may not be suitable for shipment by postal carrier but may be transportable by a commercial parcel service. Once the fulfillment means has been selected, the consumer may be requested to provide a suitable address to which the selected items are to be delivered.

Once all of the information needed for payment and order fulfillment have been collected from the consumer, the consumer may then choose to complete the ordering process by selecting/clicking-on a user interface element such as, for example, a "place order" or similar button or link that indicates a desire by the consumer to complete the purchase of the selected items using the user-selected fulfillment and payment options.

In a representative embodiment of the present disclosure, a system such as, for example, the host system 68 of FIG. 1 may then perform a process of identifying additional product items that have a high likelihood of being of interest to, and therefore a high likelihood of purchase by the consumer that just placed their order. The process of identifying such additional product items may include, by way of example and not limitation, the analysis of information representative of the contents of the "shopping cart" for the order just placed by the consumer, the analysis of personal information about the consumer, and the analysis of information representative of purchase selections or social networking activity of a group of consumers other than the consumer.

In a representative embodiment of the present disclosure, the analysis of the contents of a "shopping cart" of a consumer may take into account a number of parameters including, by way of example and not limitation, information that identifies the specific product items selected for purchase by the consumer in the most recent order, information about products available from the merchant or their business partner(s) that are related to one another or that are frequently purchased together, and products that are currently "trending" or considered to be popular with consumers as indicated by communication among member of a social network.

In a representative embodiment of the present disclosure, the identification of additional product or service items that have a high likelihood of being of interest to, and therefore a high likelihood of purchase by the consumer may include the analysis of personal information gathered and maintained by the merchant in a profile for the consumer. Such a profile may include, for example, the personal purchase and/or shopping history of the consumer gathered from the shopping activities of the consumer on the web site of the merchant and its business partners, or at "in-store" locations of the merchant and its business partners. The profile may also include personal information about the consumer collected using polls, questionnaires, and various other approaches employed by the merchant and its partners to gather information about the consumer. Such approaches may be either explicit, as in the use of questionnaires in which the consumer self-identifies, by way of example and not limitation, their manufacturer, brand, model, designer, style, color, or other product preferences, or the personal information may be derived from observations of consumer shopping behavior including social indications such as, for example, expressions of feeling or relationships with products such as "Like," "Want," and "Have/Own," and recommendations and comments posted by the consumer on a social e-commerce system operated or sponsored by the merchant or its partners.

In a representative embodiment of the present disclosure, the information about the preferences of a consumer may be derived from observations of the behavior of the consumer when shopping online or in-store. By way of example and not limitation, a consumer may perform an online search for a given product item such as a particular article of clothing (e.g., a white silk blouse in size medium), a particular tool (e.g., a crosscut hand saw), or a particular personal care product (e.g., a particular conditioner for dry hair). The search results provided to the consumer may include several different brands of the particular item identified by the consumer. The user may then select "Brand X" from the array of choices for the particular product item, to add to their shopping cart. Information about the occurrence of the consumer choice of "Brand X" may be recorded in the personal information of the profile of the consumer. Upon the occurrence of a certain number of selections of, by way of example and not limitation, a specific brand, style, scent, color, designer, manufacturer, or model of product items by the consumer, a system in accordance with the present disclosure may record a preference for the specific brand, style, scent, color, designer, manufacturer, or model selected by the consumer in the personal information of the profile of the consumer. In a similar fashion, preference information may be derived from social indications selected or expressed by a consumer such as, by way of illustration and not limitation, consumer selection of icons indicating "Like," "Want," "Have," "Own," "thumbs-up," "plus," or "+1," to name only a few examples.

Preference information may also be derived based upon online shopping activities such as, by way of example and not limitation, the number of consumer page views of particular products, brands, styles, designers, manufacturers, or models. Observations of the shopping behavior of a consumer may be made both while online at home using a personal computer, at an in-store location of a merchant or business partner of the merchant, or at any location using a mobile device online. A representative embodiment of the present disclosure may integrate observations made in various shopping and purchase venues to derive personal preference information for a consumer. For example, such observations may include those communicated to a system of the present disclosure from a mobile application of an electronic device used by the consumer to optically scan a barcode, two-dimensional code, or other form of indicia, or wireless capture a code from a radio frequency identification (RFID) device, using any suitable technology known now or in the future.

In a representative embodiment of the present disclosure, the analysis of information representative of purchase selections or social networking activity of a group of consumers other than the consumer may be based on observations collected by monitoring a group of consumers such as, for example, the population of consumers shopping on a web site or at in-store locations of a merchant and its business partner(s), or at other web sites operated by those other than the merchant and its business partner(s). The analysis may take into account the purchases, preferences, and social indications of product interest of various consumers including, for example, those that have chosen to become members of a loyalty program of the merchant(s) operating or sponsoring the web site on which the consumer is shopping. Information about the purchases of the consumers may be collected from transactions performed at point-of-sale (POS) terminals at business locations of the merchant and their business partner(s), and at kiosks located within business locations of the merchant or partner(s) or located in public venues. The information about purchases may also be collected from transaction processing systems that handle on-line (e.g., Internet-based) shopping activities and purchases by members of the group of consumers.

The analysis performed by a representative embodiment of the present disclosure may identify a collection of a number of product items that may be of interest to, and therefore have a higher than average likelihood of purchase by the consumer, and may apply one or more filters to the collection of product items and/or services likely to be of interest to the consumer. As part of that analysis process, each of the items in the collection may be assigned a level or rank of likely interest to, or probability of purchase by, the consumer. A subset of the collection made up of a particular number of the product or service items in the collection may be selected for promotion to the consumer, in order of decreasing level of interest or likelihood of purchase by the consumer. The product items identified a being of interest to the consumer may be then be recommended to the consumer by arranging them in a display, based upon various criteria or filters.

For example, in some representative embodiment of the disclosure, the product items identified for the consumer may be selected for display based upon the level or rank of likelihood of interest by the consumer, and/or based upon the profit margin for the item. The product items may be selected for display based on whether a particular item is available for purchase and fulfillment using the payment and fulfillment means selected by the consumer for an order just completed by the consumer. In a representative embodiment of the present disclosure, the product item(s) selected for promotion to the consumer may be displayed in any of a number of ways including, by way of example and not limitation, as a carousel of product information such as that shown in FIGS. 3A and 3B, discussed in further detail, below. In response to the display of such product information, the consumer may select one or more items, and may be enabled to complete the purchase with minimum effort, through the use of payment and fulfillment information provided by the consumer, for example, while completing a previously order.

FIGS. 2A-2D are a flowchart illustrating an exemplary method for identifying and promoting products that, upon completion of consumer selection of items of a current order, have a high likelihood of being of interest to the consumer and for which an order may be placed with minimum additional effort on the part of the consumer, in accordance with a representative embodiment of the present disclosure. The following discussion of the various actions described in FIGS. 2A-2D may be performed by various elements of the system described above with respect to FIG. 1. For example, in some representative embodiments of the present disclosure, the actions of the various portions of FIGS. 2A-2D may be performed by a system such as the host system 68 communicating via a network with a browser application running on a user device such as, for example, any of processing devices 20, 20', 20" of FIG. 1. In another representative embodiment of the present disclosure, portions of the actions described with respect to FIGS. 2A-2D may be performed by what may be referred to herein as an application, "app," or "mobile app" installed on a user device (e.g., one of processing devices 20, 20', 20" of FIG. 1) by the user, while other portions of the actions of FIGS. 2A-2D may be performed by one or more processors of other element of a system such as that shown in FIG. 1.

Figure 2A:
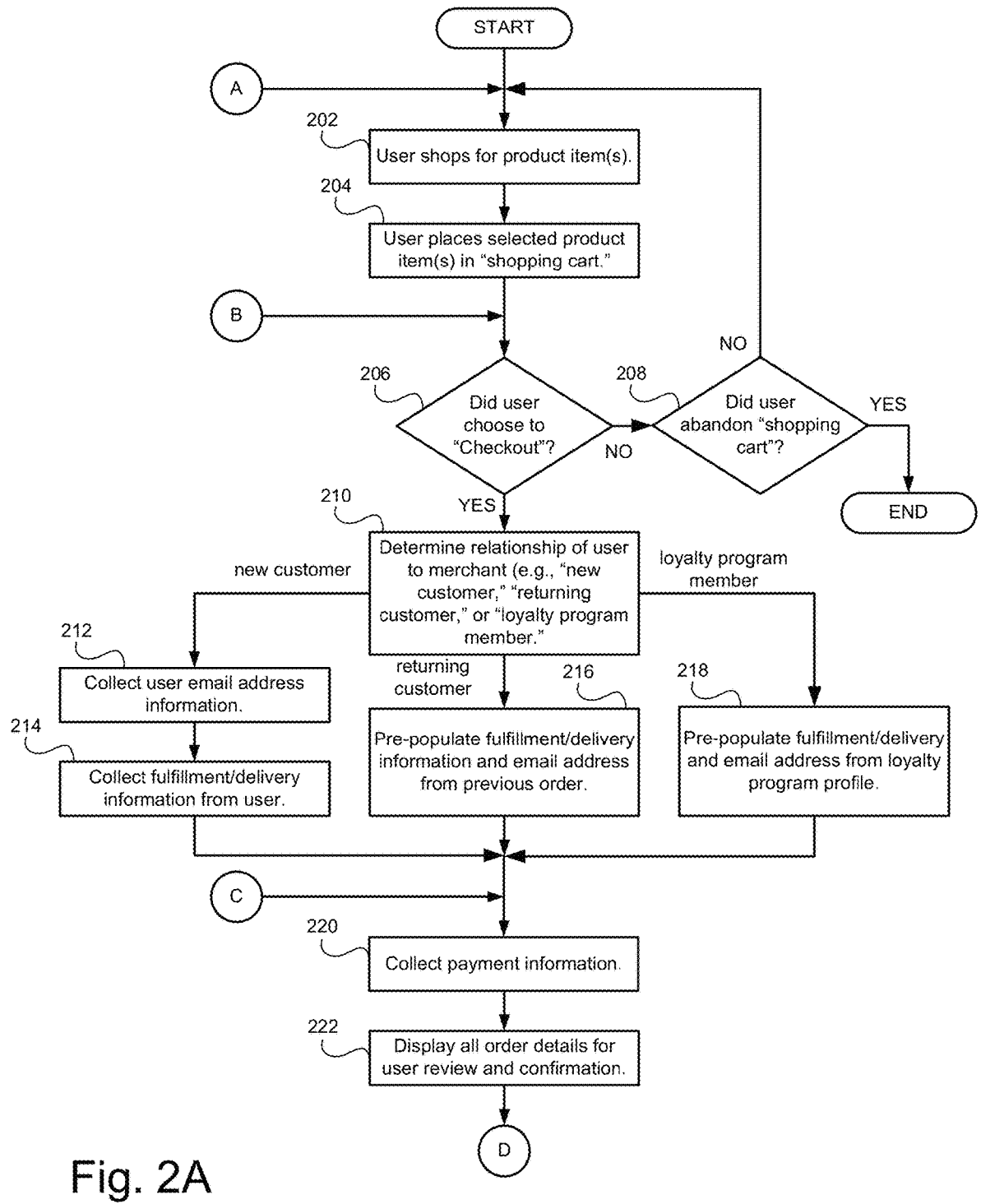
FIGS. 2A-2D are a flowchart illustrating an exemplary method for identifying and promoting products that, upon completion of consumer selection of items of a current order, have a high likelihood of being of interest to the consumer and for which an order may be placed with minimum additional effort on the part of the consumer, in accordance with a representative embodiment of the present disclosure.
Figure 2B:
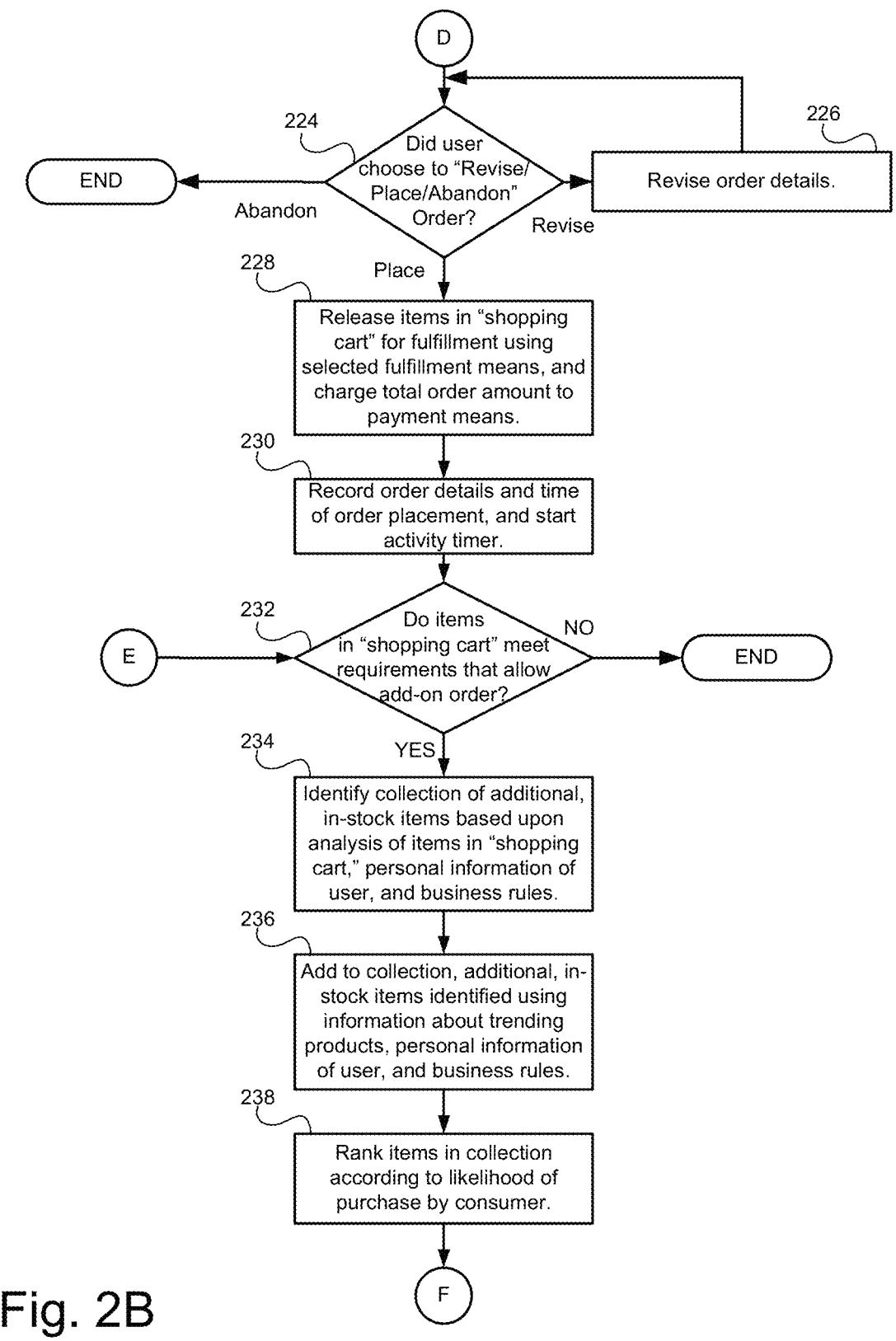

The method of FIGS. 2A-2D begins at block 202 of FIG. 2A, where a system such as the host system 68 of FIG. 1 enables a user to shop for product items using a browser or other software application of a device such as one of the processing devices 20, 20', 20" of FIG. 1. Shopping by the user may occur when, for example, a user of a user device such as, by way of example and not limitation, a cell phone; a smart phone; a tablet, laptop, or desktop computer; or a media player, uses a software application or "app" to interact with the host system 68 via a communication network such as, for example, the Internet. In some instances, the use of such an application may be limited to consumers that are member of a loyalty program operated by or for the merchant that operates or sponsors the host system 68 of FIG. 1. The user may, at block 204, select one or more product items and place those items in an electronic or virtual "shopping cart" that maintains information about the selected items for the user. In the example of FIG. 2A, a determination is made, at block 206, as to whether the user has chosen to proceed to "checkout," to complete the purchase of the selected items. If the user has not chosen to "checkout," the method of FIG. 2A may proceed to determine, at block 208, whether the user has abandoned their "shopping cart" by, for example, leaving the web site of the merchant, or by lack of shopping activity for at least a certain duration of time. If, at block 208, the system performing the method determines that the user has not abandoned their "shopping cart," the method of FIG. 2A returns to block 202, allowing the user to continue their shopping activity. If, however, the system determines, at block 208, that the user did abandon their "shopping cart," the method of FIGS. 2A-2D ends.

If, at block 206, it is determined that the user has chosen to "checkout," the system may, at block 210, determine the relationship of the user to the merchant operating or sponsoring the system. In the example of FIGS. 2A-2D, the user may be asked to identify themselves as a "new customer," a "returning customer," or a member of a "loyalty program" in which the user may receive particular benefits (e.g., discounts, rewards, special promotions, rebates, or other monetary or non-monetary benefits). The user may, for example, self-identify by entering their email address, by clicking on/selecting a button that indicates their relationship to the merchant, by "logging in," or by any other suitable means. If, at block 210, it is determined that the user is a "new customer," the method of FIG. 2A may proceed to block 212, where they are asked to provide their email address, and continue on to block 214, at which the user may be asked to provide fulfillment information (e.g., shipping/delivery/pickup address, shipping means/speed), to enable fulfillment of their present and/or future order(s). The method then passes to block 220, described below.

If, at block 206, the system determines that the user is a "returning customer," the system may access stored information that was collected from the user during an earlier purchase transaction or encounter of the user with the merchant (e.g., credit card application, request for information). Such information may be maintained, for example, in a persistent data store such as the data repository 68A of FIG. 1. The stored information about the user may then be used to pre-populate email and fulfillment/delivery information in any forms/screens/pages normally used to prepare an order for placement. The method of FIG. 2A may then continue at block 220, described below.

The system may determine, at block 206, that the user is a "loyalty program member. In that instance, the method of FIG. 2A may access a "member profile" containing information collected from various user transactions with the merchant operating or sponsoring the system, or business partners such as other businesses that have entered into agreements with the merchant to share information and benefits, for example, their collective loyalty club members. Such a "member profile" may include, by way of example and not limitation, the user's age, any demonstrated (e.g., from web browsing history) or expressed (e.g., from consumer questionnaires) product category interests, a life-stage of the user (e.g., college student, newly-wed, parent, elderly or retired, home-owner, etc.), user purchase history, basic needs, aspirational goals, delight, and satisfaction. Such personal information may be stored in a persistent data store such as the data repository 68A of FIG. 1. The stored information about the user may then be used to pre-populate email and fulfillment/delivery information in any forms/screens/pages normally used to prepare an order for fulfillment. The system may then continue at block 220.

Next, at block 220, the method may direct the system to collect information about the means to be used by the consumer in payment for the selected product items. Depending upon the relationship of the user to the merchant and/or their partners, such information may be present in the personal information of the user maintained by the system, and the user may be prompted to review and/or enter such information. Then, at block 222, the system performing the method of FIG. 2A may display, for example, an order summary detailing the user-selected product items, fulfillment and payment information, and other parameters to the user for review and confirmation before order placement. The method of FIGS. 2A-2D then continues at block 224 of FIG. 2B.

At block 224, a determination is made as to whether the user has chosen to revise their order, place their order, or abandon/cancel their order. If the user chooses to revise their order, the system continues at block 226, where the user is permitted to make various changes to the collection of selected product items, the fulfillment details, and payment information. If the user chooses to abandon or cancel their order, the method of FIGS. 2A-2D ends. If, however, the user chooses to "place" their order, the method of FIG. 2B continues at block 228, where the method releases the product items in their "shopping cart" for fulfillment using the fulfillment/shipping/pickup means, the form of payment, and other similar order details provided by the user, or accessed in the personal information for the user that is maintained by the system. The total amount of the order is also charged to the form of payment selected by the user. Then, at block 230, the method may record order details including, by way of example and not limitation, the time of order placement, the items purchased, the fulfillment/shipping/pickup details, and any other suitable information about the order. Such information may, for example, be included in the personal profile for the user. In addition, the system performing the method of FIG. 2B may start an "activity timer," to be used in the manner described below with respect to block 251.

Next, at block 232, a determination is made as to whether the items in the "shopping cart" meet requirements for what may be referred to herein as an "express purchase," "express order," "add-on purchase," "add-on order," and/or "follow-on order." The requirements for such an "add-on" order may include, by way of example and not limitation, that at least one item in the "shopping cart" be a physical product. That is, in some representative embodiments of the disclosure, the system may not offer the user the opportunity to place an "add-on" order if the items in the "shopping cart" include only items such as a service contract, or a gift certificate. If that is the case, the method of FIG. 2B ends, and the interaction with the user with regard to placement of an "add-on," "express," or "follow-on" order ends. If the items in the "shopping cart" do meet the requirements for an "add-on," "express," or "follow-on" order, the method continues at block 234.

At block 234, the method uses the information about the items in the "shopping cart;" personal information about the user that is maintained by a system such as, for example, the host system 68 on the data repository 68A; and a set of business rules, to identify a collection of additional, product items that are likely to be of interest to, and therefore likely to be purchased by the user. Such items make be selected by the system because they are related to items in the order just placed, or to past purchases by the user, by way of example and not limitation, attachments, accessories, and/or add-ons for a previously purchased tool, appliance or clothing ensemble. In some representative embodiments, the selected product items may only be selected if they are "in-stock" items. The additional product items may also be items that may be used in work or hobby activities in association with a tool or appliance in the "shopping cart" of the order just placed, or something previously purchased, and may include consumables such as batteries, fuel, filters, ink/toner, disposable diapers, cleaning products, and/or personal care products that the user has currently or previously purchased, and/or replacement parts known to be subject to wear for a device, tool, or system product just purchased, or purchased in the past.

In a representative embodiment of the present disclosure, the analysis of the personal information of the user may recognize patterns in purchase behavior such as, by way of illustration and not limitation, that Mr. Smith buys 2 cans of Regal shaving crème every month, and may recommend Regal shaving crème because 28 days have passed since his last purchase of Regal shaving crème. The additional product items selected for the user may be chosen based upon a match or close association of one or more "tags" assigned to product items by the merchant, their partner(s), and/or other users, with "tags" or parameters associated with the user as recorded in the personal profile of the user. In addition, the additional items selected for the user may be selected using information about shopping behavior of or product purchases by other users/consumers that are similar to the user in terms of their purchase history, their interests, their preferences, their taste, and/or their stage in life (by way of example and not limitation, those that are single, engaged, married, expecting a child, have teenage children, are retired, have one or more pets, an individual that likes to "do-it-yourself," someone that likes to sew, and/or a car enthusiast).

The system may then, at block 236, add items to the collection of additional items, based upon information about those product items that are, for example, popular with, or experiencing growth in popularity with, the users of the system, which may be referred to herein as "trending items." Such information gathered by the system may be used, along with personal information about the user, and business rules of the merchant and/or their partners (e.g., rules related to means of shipment involved in fulfillment and the preferred/ historical means of fulfillment of the user, number of a particular item in stock, availability of an item at the preferred merchant location of the user), to select further items to be added to the collection.

Next, at block 238, the system may analyze information about the items in the collection of items, and may rank order the items in order of likelihood of purchase by the user. For example, the system may, for each product item in the collection, calculate a value reflecting a combination of factors than influence the likelihood of purchase of the item by this specific user. This may include factors such as, by way of example and not limitation, whether the user has purchased the same item or items in the same family or type of product in the past; whether the user has explicitly, or through their purchase history or interactions with the merchant or their partner(s), indicated an interest or preference for the designer and/or manufacturer of the item. The factors used in the ranking may include, for example, whether other users that have been determined to be similar to this specific user to a particular degree or level (e.g., those having similar taste, similar purchase history, similar income, similar form of payment used, similar stage in life, similar browsing/ shopping history), that when offered items from the collection, went on to actually purchase the offered item. Upon completion of the ranking of the collection of items selected for the user, the method may proceed to block 240 of FIG. 2C.

Figure 2C:
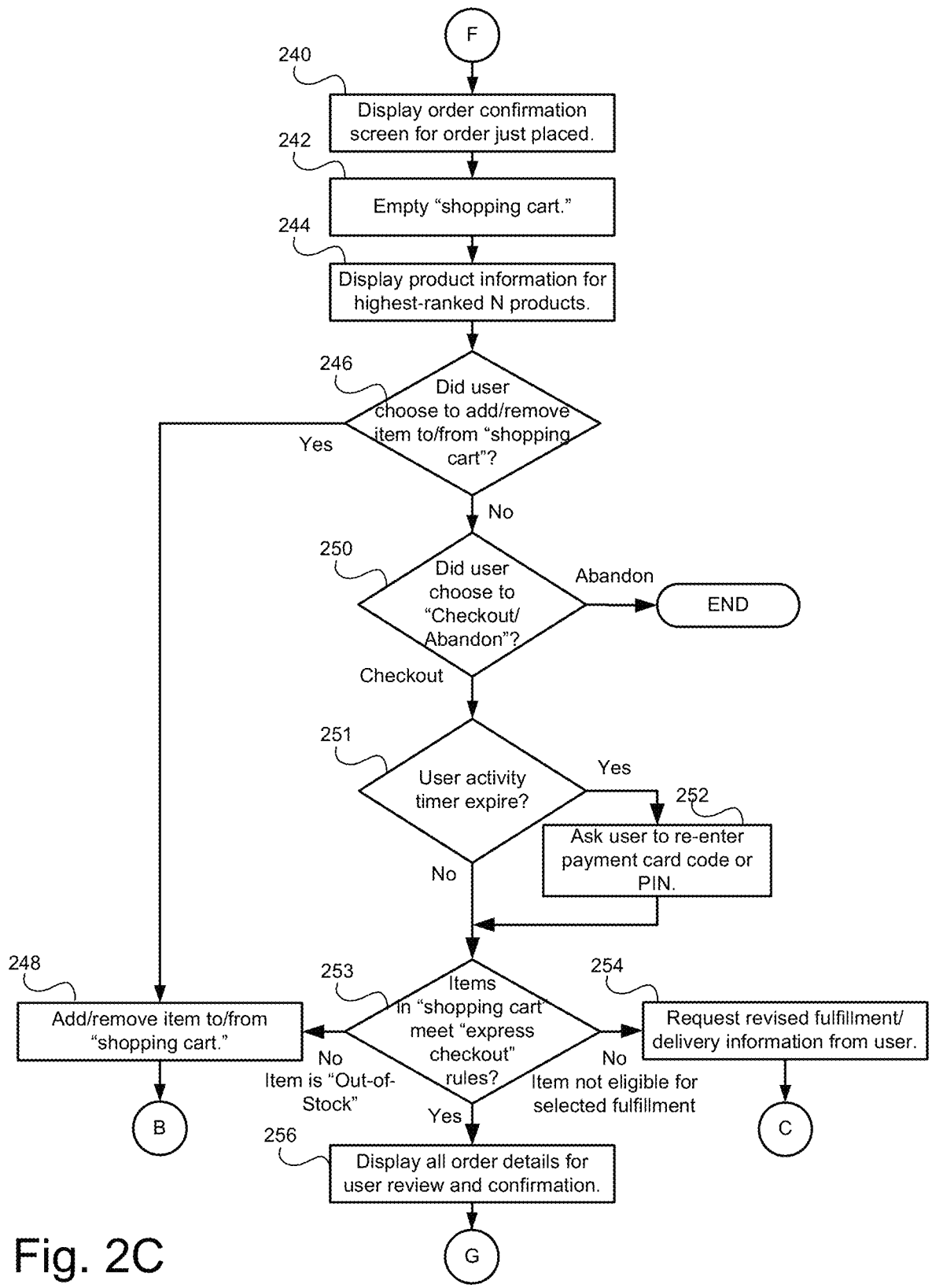

At block 240, the method of FIG. 2C may display an order confirmation screen/page, confirming placement or completion of the order represented by the items in the "shopping cart," and the fulfillment and payment information provided by or for the user. The system performing the method of FIGS. 2A-2D may then, at block 242, empty the items from the current "shopping cart." As noted above, a record of the items in the just-placed order, and the associated order details, may be maintained by a system such as the host system 68, for later reference. Next, at block 244, the method of FIG. 2C may direct the system to display to the user, information about a particular number of product items from the ranked collection of items selected as being likely of interest to the user. By way of example and not limitation, a representative embodiment of the present disclosure may display 3-10 of the items in the ranked collection most likely to be of interest, and therefore most likely to be purchased by the user. Information about each of the items may be displayed, for example, as a list of product name and prices; as any suitable arrangement of boxes containing product details, picture(s), and pricing, or as a carousel or other mechanism that display a limited, but scrollable subset of the most likely items to be purchased by the user. Each of the items displayed may have an associated button or other user interface element, to enable the user to add the associated product item to an electronic "shopping cart" for what may be referred to interchangeably herein as an "express purchase," an "add-on purchase," an "add-on order," and/or a "follow-on order."

Next, at block 246, a determination is made as to whether the user has chosen to add or remove an item from the displayed items to the electronic "shopping cart" for an "express purchase," an "add-on purchase," an "add-on order," and/or a "follow-on order." If it is determined that the user did choose to add an item to, or remove an item from, the "shopping cart" then, at block 248, the user-identified one of the displayed product items may be add to, or removed from, respectively, the "shopping cart." The method may then continue from block 206. If, however, the user did not choose to add or remove an item to/from the "shopping cart," then the method of FIG. 2C may move to block 250, where a determination is made as to whether the user has chosen to proceed with what may be referred to herein as "express checkout" and purchase the selected additional items as an "express purchase," "express order," "add-on purchase," "add-on order," and/or "follow-on order," or to abandon the merchant website and their review and consideration of the displayed items specifically selected by the system for this specific user. If it is determined that the user abandoned the merchant web site, the method of FIGS. 2A-2D ends.

If the user, at block 250, chooses to proceed to "express checkout," the method of the present disclosure may move to block 251, where a determination is made as to whether the user activity timer, started at block 230, has expired. The user activity timer may be used to help determine whether the user has simply walked away from the user device on which the prior order was placed, or is taking a long period of time in making further choices from the merchant web site. If it is determined, at block 251, that the user activity timer has not expired, the method of FIG. 2C continues at block 253. If, however, it is determined that the user activity timer has expired, then the method, at block 252, prompts the user to re-enter information to be used for validating the method of the payment used. For example, having placed their original order, the user may have no interest in the additional product items that were specifically selected for them, and may fail to "logout" from the merchant or partner web site. Requesting entry of, by way of example and not limitation, a payment card code or personal identification number (PIN), helps to avoid leaving the user device accessible and unattended, and configured with the personal information for the user. Following user entry of the appropriate information for validating the method of payment used for the "express purchase," an "add-on purchase," an "add-on order," and/or a "follow-on order," the method of FIG. 2C continues at block 253.

At block 253, the method may determine whether the items in the "shopping cart" for their "express purchase," "express order," "add-on purchase," "add-on order," and/or "follow-on order" meet a set of requirements or rules for "express checkout." In some representative embodiments of the present disclosure, a product item may not be eligible for "express checkout" if it requires a different fulfillment means such as, for example, if it cannot be delivered to the user via the user-selected shipping/delivery means. In some representative embodiments of the present disclosure, a product item may not be eligible for "express checkout" if the user chooses to change the delivery/fulfillment mechanism (e.g., delivery by commercial ground service, pickup at a preferred location of the merchant or partner, air shipment). If any item in the "shopping cart" is not eligible for "express checkout" using their selected means of order delivery/fulfillment, the method may proceed at block 254, where the user may be asked to revise their delivery/ fulfillment choice. Following user adjustment of the delivery/fulfillment information, the method of FIG. 2C may continue at block 220, discussed above.

If, at block 253, it is determined that one or more items in the "shopping cart" are not eligible for "express checkout" because those item(s) are "out-of-stock" from the merchant, then the method may proceed at block 248, where the user may be notified that the "out-of-stock" item has been removed from their "shopping cart." This may happen, for instance, where as item was "in-stock," during earlier selection by the user but, due to demand or user delay in completing the "express purchase," the merchant inventory of the selected item has been depleted. The method of FIG. 2C may then proceed to block 206, described above. If, however, all of the items in the "shopping cart" meet the requirements or rules for "express checkout," a screen/page may be displayed to the user showing details of their "express purchase," for user confirmation of the products items and the fulfillment and payment information, which unless changed by the user may be the same fulfillment/ delivery and payment information used for the prior order placed by the user. The method of FIG. 2C then proceeds to block 258 of FIG. 2D.

Figure 2D:
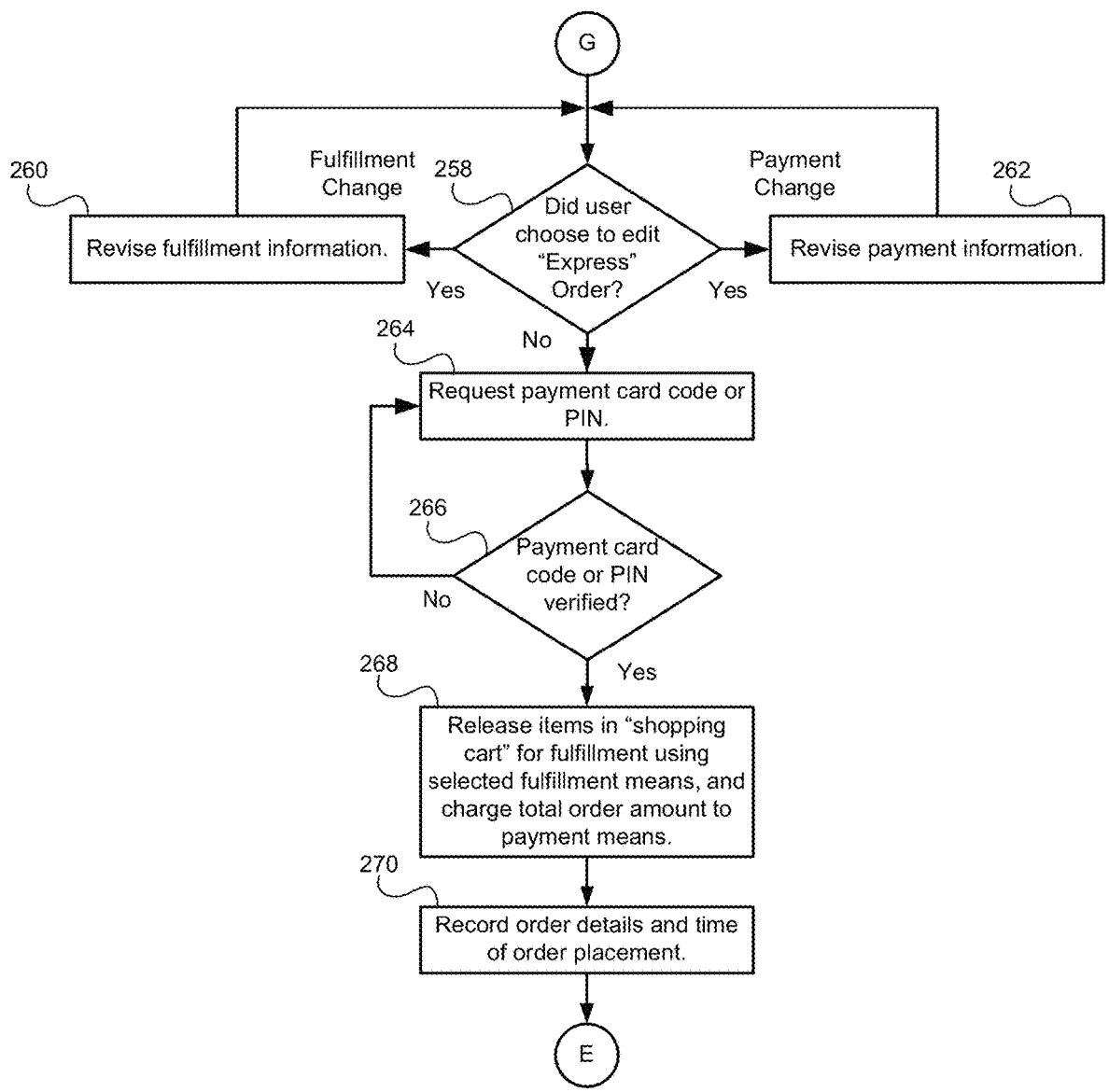

At block 258 of FIG. 2D, a determination may be made as to whether the user has chosen to revise or edit their "express purchase." If it is determined that the user has chosen to make a change in the method of payment, the method of FIG. 2D may continue at block 262, and revise the payment information associated with the "express purchase." The method may then return to block 258. If it is determined that the user has chosen to may a change in fulfillment/delivery, the method of FIG. 2D may proceed at block 260, where the method enables the user to revise the fulfillment/delivery information for their "express purchase." If it is determined, at block 258, that the user has not chosen to change either the payment information or the fulfillment/delivery information, the method of FIG. 2D may proceed to block 264, where the system performing the method of FIG. 2D may prompt the user to provide any validation information for the use of the payment means selected by the user such as, for example, a payment card code (e.g., card verification code (CVV)) or PIN code. If, at block 266, the validation information is found to be incorrect, the method returns to block 264, and the user is again asked for the needed validation information. If, however, the payment means validation information is correct, the method of FIG. 2D continues at block 268.

At block 268, the system directed by the example method of FIGS. 2A-2D releases the "express purchase" for fulfillment using the user-selected fulfillment/delivery means, and the total amount due to the merchant/partner is requested from the user-selected payment means. Next, at block 270, the method of FIG. 2D may direct a system such as the host system 68 to record details of the "express purchase" in persistent storage such as, for example, the data repository 68A of FIG. 1, which may include updating such information in the purchase history, user fulfillment and payment preferences, user shopping behavior, and other aspects of the personal profile information of the user. The method of FIGS. 2A-2D then continues at block 232, described above.

Figure 3A:
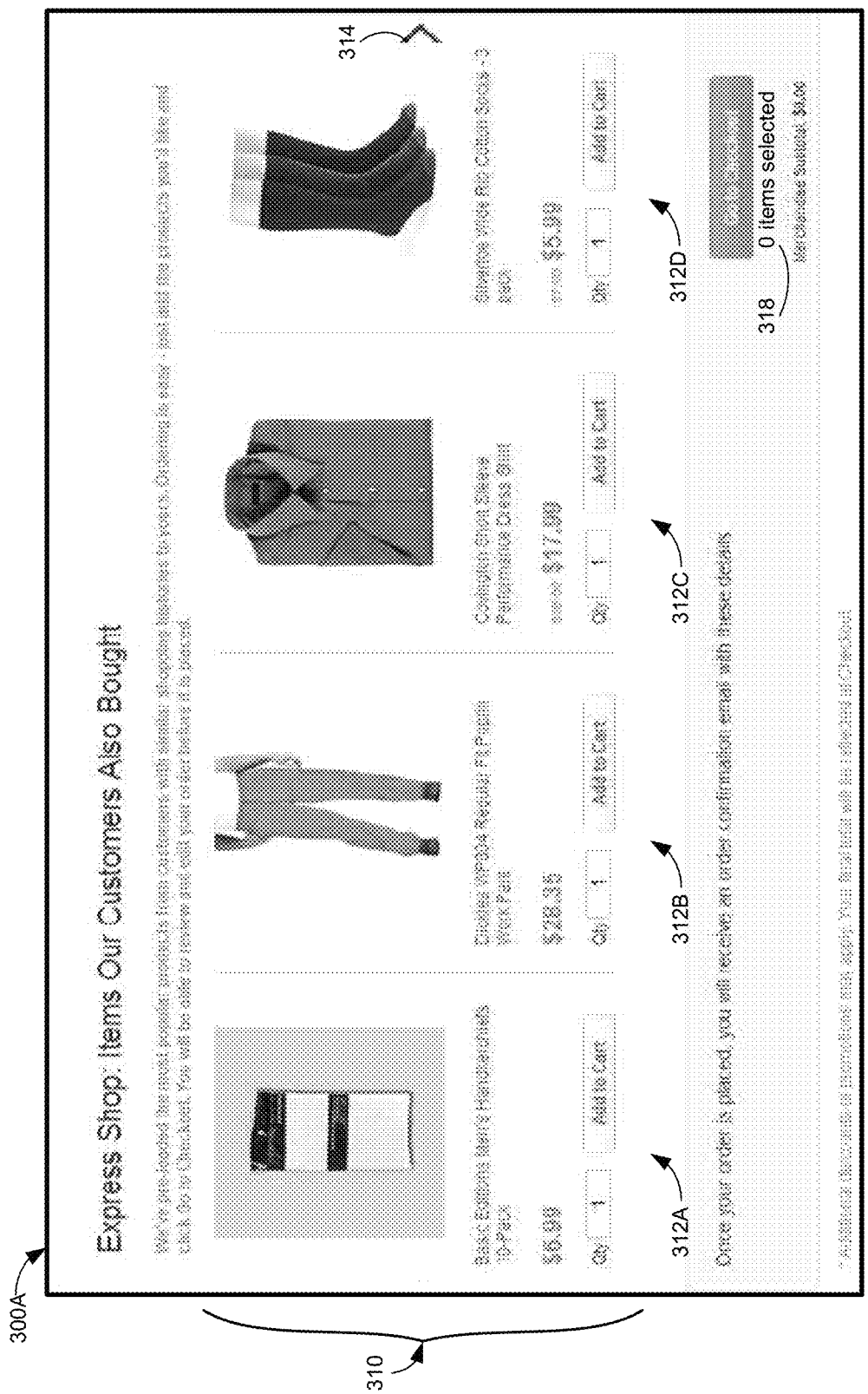
FIG. 3A is an illustration of a screen image of an exemplary order confirmation page showing a carousel displaying a group of four products of a collection of products selected for recommendation to the consumer for an "express purchase," based on a number of factors including purchase history information of the consumer, in accordance with the present disclosure.

FIG. 3A is an illustration of a screen image 300A of an exemplary order confirmation page showing a carousel displaying a group of four products 312A, 312B, 312C, 312D of a collection of products selected for recommendation to the consumer for an "express purchase," based on a number of factors including purchase history information of the consumer, in accordance with the present disclosure. The screen image 300A includes a carousel portion 310 for displaying product items specifically selected for a consumer based upon various factors including purchase history, shopping behavior, user preferences, and other personal information of the user. The carousel 310 shown in the example of FIG. 3A includes four product portions 312A, 312B, 312C, 312D, where each product portion includes a product image and an associated brief product description, a product price, a purchase quantity box, and a "Add to cart" button, to enable the user to indicate a desired quantity of the identified product item to be added to the "shopping cart" for an "express purchase. The illustration of FIG. 3A also include an items indicator 318 that shows the total number of the product items that were specifically selected for recommendation to the user, and those which the user has selected for purchase. The displayed four product portions 312A, 312B, 312C, 312D may represent a subset of a greater number of product items of a collection specifically recommended for an "express purchase" by a user, based on personal information about purchase behavior and personal preferences specific to the user. Additional product items from the collection of product items selected for recommendation to a user may be viewed using a "right arrow" 314. A "left arrow" (not shown) may be also displayed as the user moves among the displayed products, to enable the user to view any product items positioned to the left of the leftmost product item. The products shown may be a certain number of the product items most likely to be chosen/purchased by a particular user, which have been selected from a larger collection of product items selected specifically for recommendation to the particular user, as described above. The certain number of product items may be ordered on the display according to a rank value calculated based on, by way of example and not limitation, an analysis of information about the items in a collection of items, and the order of the displayed items may be in order of likelihood of purchase by the user. As previously discussed above, a system in accordance with the present disclosure may, for each product item in the collection, calculate a value reflecting or representing a combination of factors that influence the likelihood of purchase of the item by this specific user.

Figure 3B:
FIG. 3B is an illustration of a screen image of an exemplary order confirmation page showing a carousel displaying a second set of four products of the collection of products selected for recommendation to the consumer, such as the product items recommended in the illustration of FIG. 3A, in accordance with the present disclosure.

FIG. 3B is an illustration of a screen image 300B of an exemplary order confirmation page showing a carousel displaying a second set of four products 312E, 312F, 312G, 312H of the collection of products selected for recommendation to the consumer, such as the product items recommended in the illustration of FIG. 3A, in accordance with the present disclosure. As illustrated in FIG. 3B, each of the products chosen for recommendation to the user may be represented in a separate product portion, where each product portion includes a product image and an associated brief product description, a product price, a purchase quantity box, and a "Add to cart" button, to enable the user to add a desired quantity of the identified product item to the "shopping cart" for an "express purchase. Other elements of FIG. 3B are also present and discussed with respect to FIG. 3A. In addition, a "left arrow" 316 permits the user to explore the information for a certain number of the other product items of the collection of product items specifically identified for the user based on personal information, examples of which were discussed above with regard to block 234 of FIG. 2B.

Figure 4:
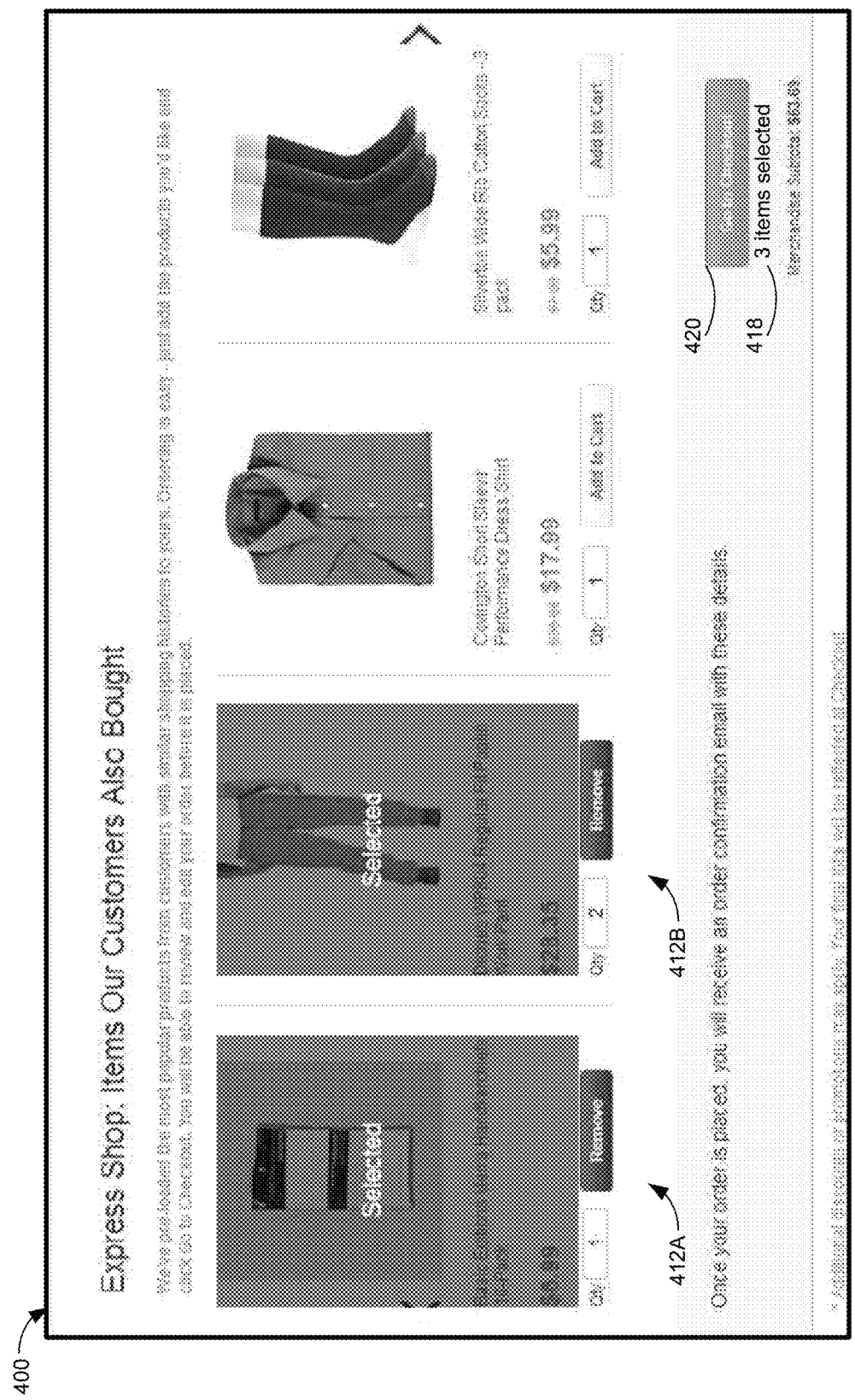
FIG. 4 is an illustration of a screen image of an exemplary order confirmation page showing a display of four products from which one of a first product and two of a second product have been chosen for purchase by the consumer from the products specifically selected for recommendation to the consumer based on personal information for the consumer, in accordance with the present disclosure.

FIG. 4 is an illustration of a screen image 400 of an exemplary order confirmation page showing a display of four products from which one of a first product 412A and two of a second product 412B have been chosen for purchase by the consumer from the products specifically selected for recommendation to the consumer based on personal information for the consumer, in accordance with the present disclosure. As can be seen in FIG. 4, two of the product portions 412A, 412B show an overlay a label of "selected," following the user clicking on/selecting an "Add to cart" button of products recommended to them, such as the "Add to cart" buttons of the product portions of FIGS. 3A and 3B. In the illustration of FIG. 4, the "Add to cart" button of two product portions 412A, 412B has been updated to "Remove," permitting the user to remove any of those items from the "shopping cart" for the "express purchase." The screen image 400 of FIG. 4 also includes an items indicator showing the number of items selected for purchase and presently in the "shopping cart."

Figure 5:
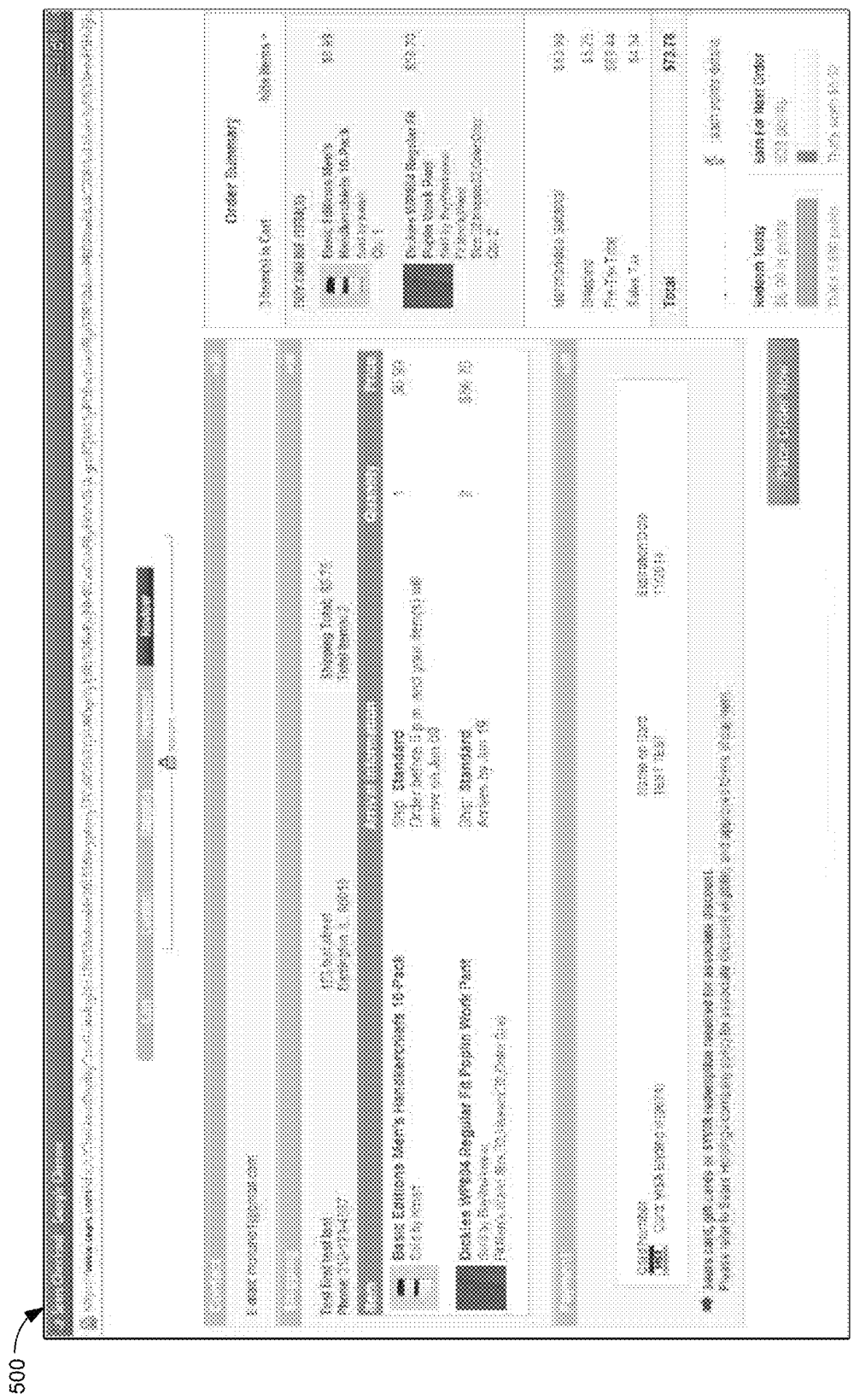
FIG. 5 is an illustration of a screen image of an exemplary order confirmation page displaying the product items selected by the consumer from a collection of product items specifically chosen for recommendation to the consumer based on personal information of the consumer, and the payment and fulfillment/delivery information, in accordance with the present disclosure.

FIG. 5 is an illustration of a screen image 500 of an exemplary order confirmation page displaying the product items selected by the consumer from a collection of product items specifically chosen for recommendation to the consumer based on personal information of the consumer, and the payment and fulfillment/delivery information, in accordance with the present disclosure. In a representative embodiment of the present disclosure, the payment and fulfillment/delivery information may not need to be entered, as the same information may be provided automatically based upon the nature of the product items and fulfillment options selected by the user, e.g., for a prior order. This enables the user to quickly make product item selections that relate specifically to them based upon, among other things, their past purchase history and their shopping behavior, and make an "express order" or "express purchase" of items which they may have forgotten, but which an embodiment of the present disclosure provided as recommendations upon completion of an earlier order.

Figure 6:
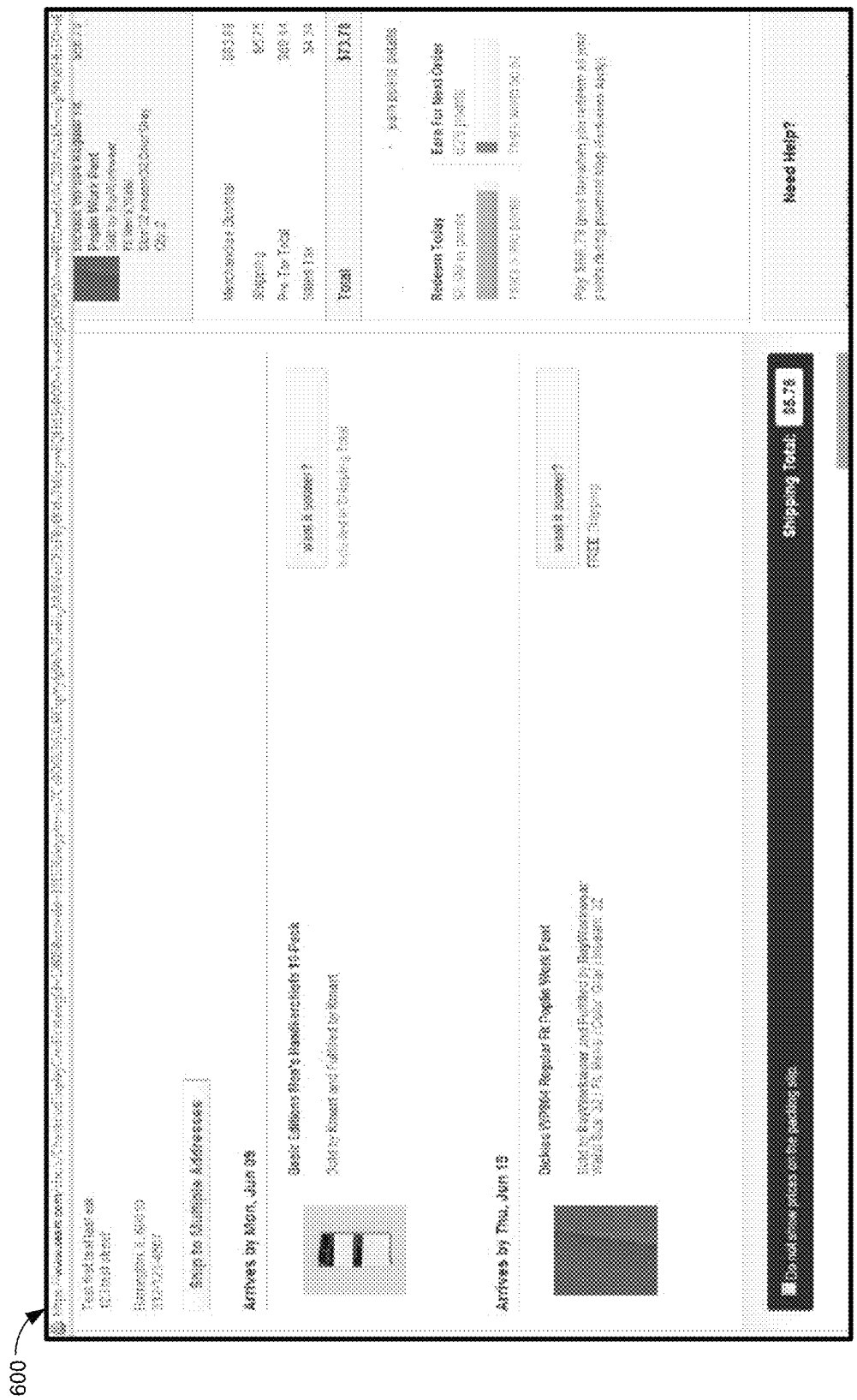
FIG. 6 is an illustration of a screen image of an exemplary shipping information page showing the products that have been selected by the consumer from the products chosen for recommendation to the consumer, and various shipping options, in accordance with the present disclosure.

FIG. 6 is an illustration of a screen image 600 of an exemplary shipping information page showing the products that have been selected by the consumer from the products chosen for recommendation to the consumer, and various shipping options, in accordance with the present disclosure. The products selected by the user may be identified from a collection of products chosen for the user based on personal information of the consumer such as, among other things, their past purchase history, user preferences, and their shopping behavior. As described above, the user has the option of keeping the fulfillment/delivery and payment options or, as in the additional options illustrated in FIG. 6, changing the delivery speed, if the selected product items meet certain conditions required for an "express purchase" in accordance with the present disclosure.

Figure 7:
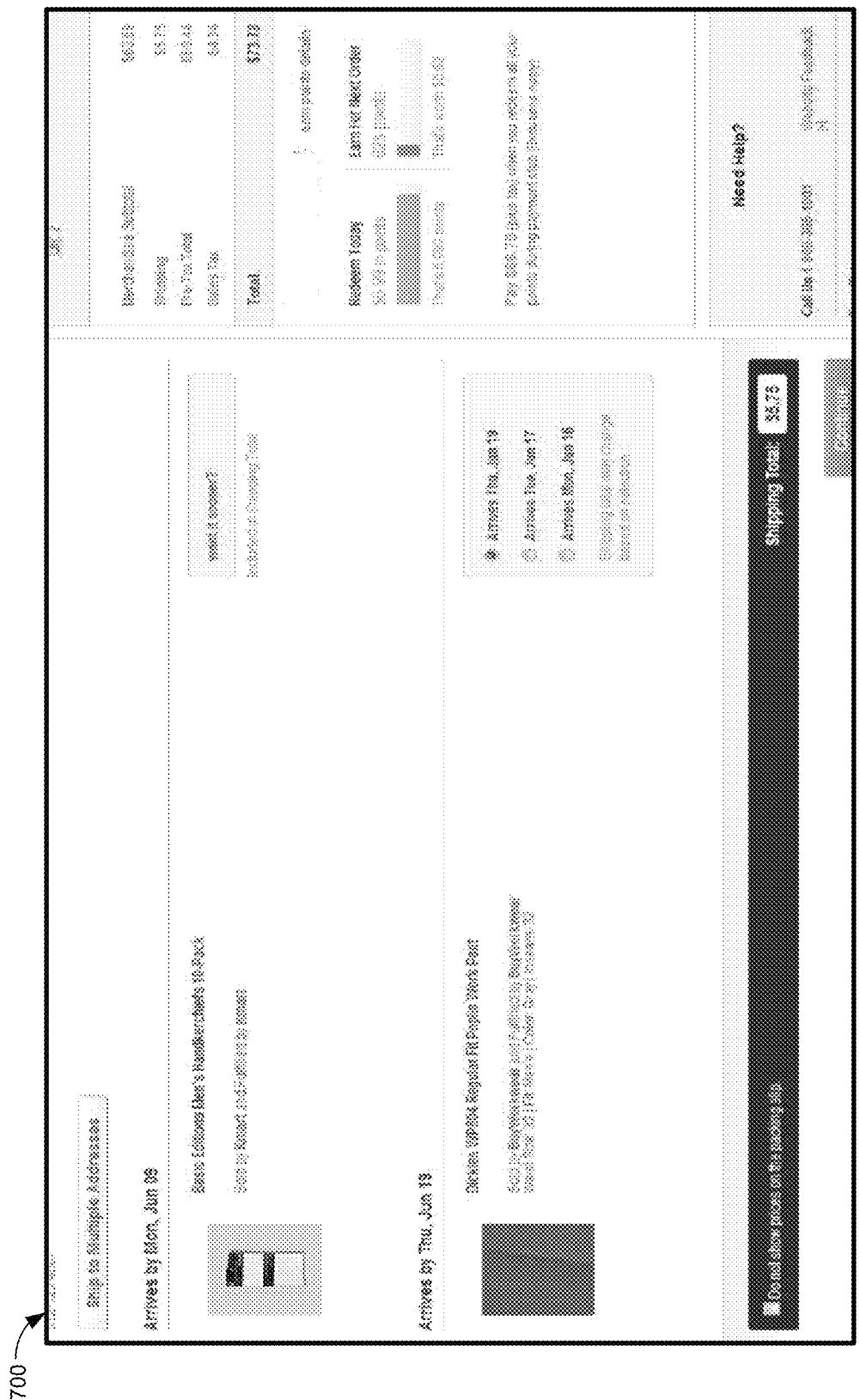
FIG. 7 is an illustration of a screen image of an exemplary shipping information page showing the speed of delivery options available for one of the products selected by the consumer from the collection of products selected for recommendation to the consumer, in accordance with the present disclosure.

FIG. 7 is an illustration of a screen image 700 of an exemplary shipping information page showing the speed of delivery options available for one of the products selected by the consumer from the collection of products selected for recommendation to the consumer, in accordance with the present disclosure. As illustrated in FIG. 7, the selection of the "Want it sooner?" link shown in the screen image 600 of FIG. 6 results in the display of different delivery date choices from that resulting from the standard or default fulfillment/delivery means that may have been selected by the user for prior orders in the order history.

Figure 8:
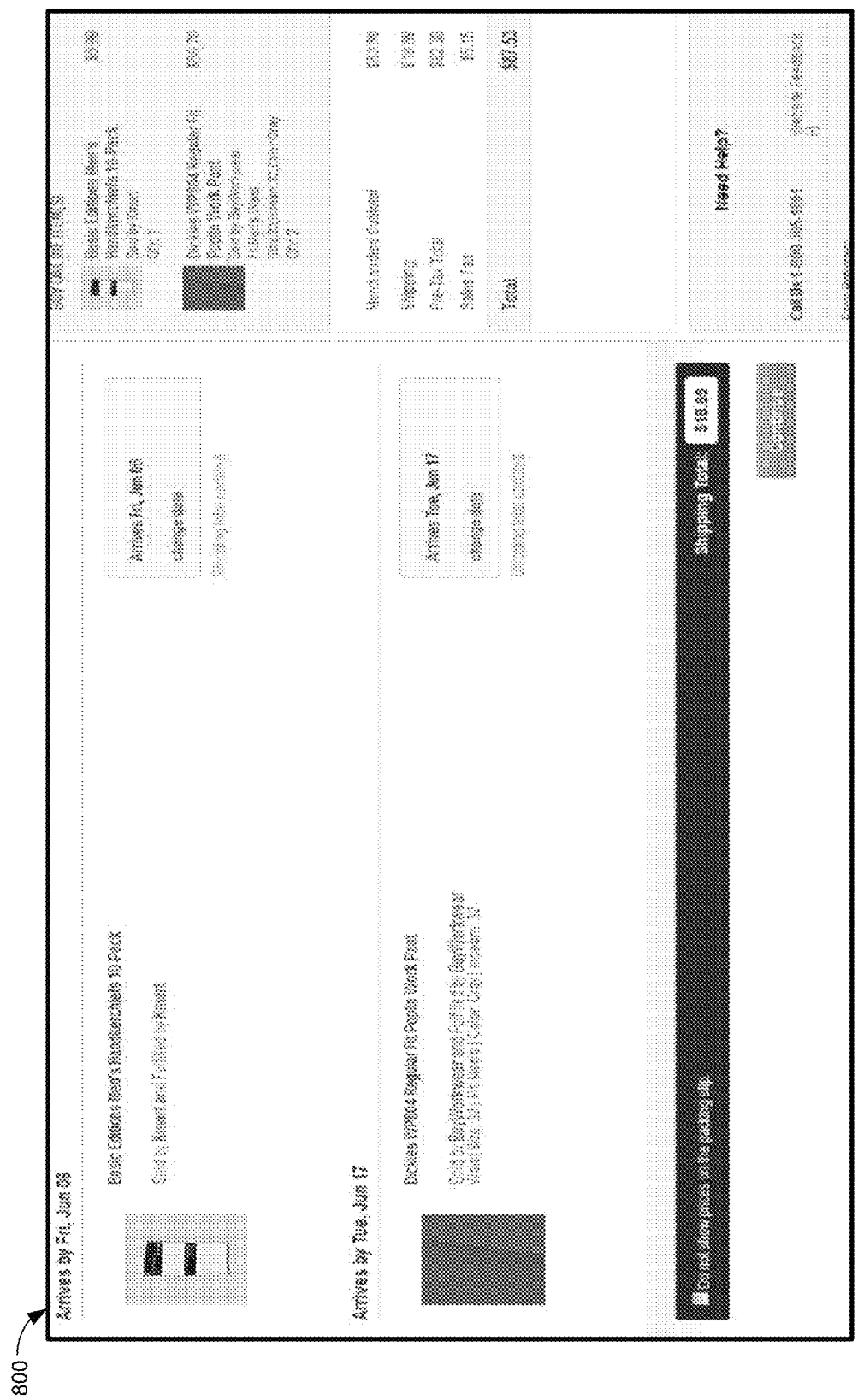
FIG. 8 is an illustration of a screen image of an exemplary shipping information page reflecting an update in delivery date and the cost of shipping chosen for a product for which the consumer chose to change the fulfillment/delivery means, in accordance with the present disclosure.

FIG. 8 is an illustration of a screen image 800 of an exemplary shipping information page reflecting an update in delivery date and the cost of shipping chosen for a product for which the consumer chose to change the fulfillment/delivery means, in accordance with the present disclosure.

Figure 9:
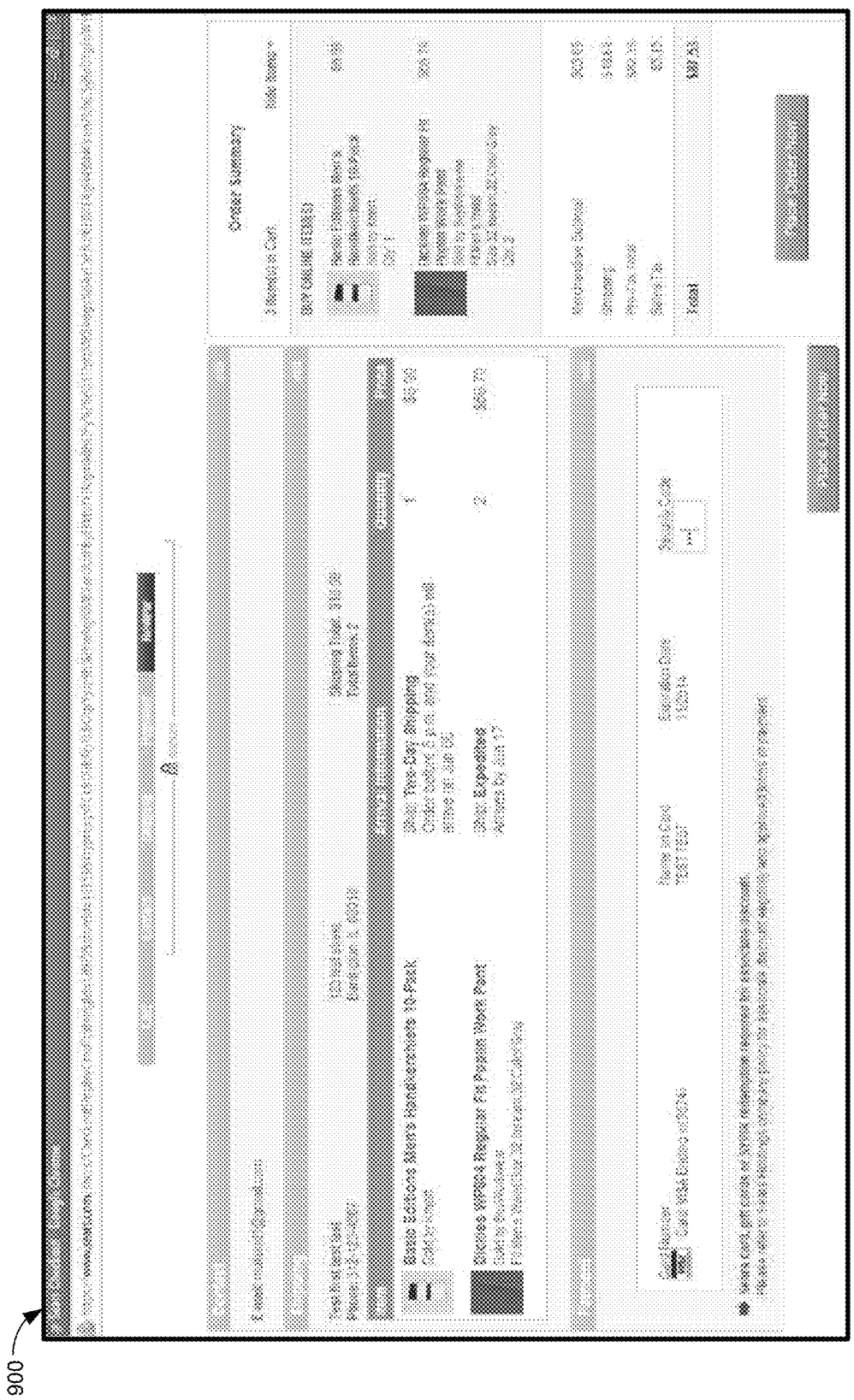
FIG. 9 is an illustration of a screen image of an exemplary order review page showing the products selected by the consumer, the change in user choice of a delivery/fulfillment for one of the selected products, and a "Place order" button that allows placement of an order for the additional products items selected by the consumer from the recommended products, in accordance with the present disclosure.

FIG. 9 is an illustration of a screen image 900 of an exemplary order review page showing the products selected by the consumer, the change in user choice of a delivery/fulfillment for one of the selected products, and a "Place order" button that allows placement of an order for the additional products items selected by the consumer from the recommended products, in accordance with the present disclosure.

Figure 10:
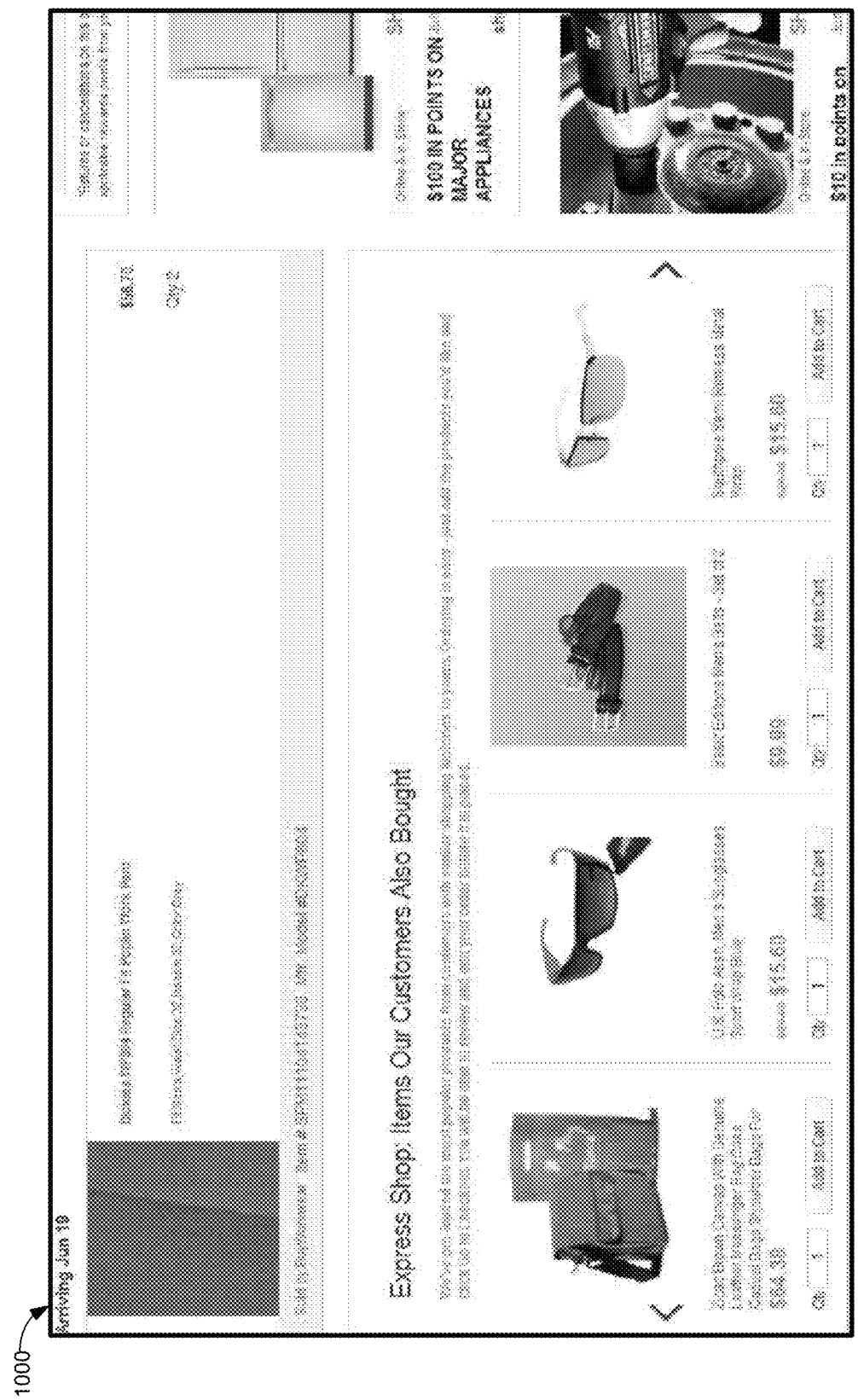
FIG. 10 shows a screen image of an exemplary order confirmation page illustrating a carousel displaying product information for a set of four products chosen from a newly selected collection of products chosen for recommendation to the consumer based on updated personal information of the consumer such as, for example, their most recent purchase history following the placing of an "express purchase," in accordance with the present disclosure.

FIG. 10 shows a screen image 1000 of an exemplary order confirmation page 1000 illustrating a carousel displaying product information for a set of four products 1012A, 1012B, 1012C, 1012D chosen from a newly selected collection of products chosen for recommendation to the consumer based on updated personal information of the consumer such as, for example, their most recent purchase history following the placing of an "express purchase," in accordance with the present disclosure. If the user chooses to select a product from those displayed, a new purchase flow in accordance with the present disclosure may begin, and a new collection of products for recommendation to the user may be chosen based on, by way of example and not limitation, the most recent product purchase history and shopping behavior information.

Figure 11:
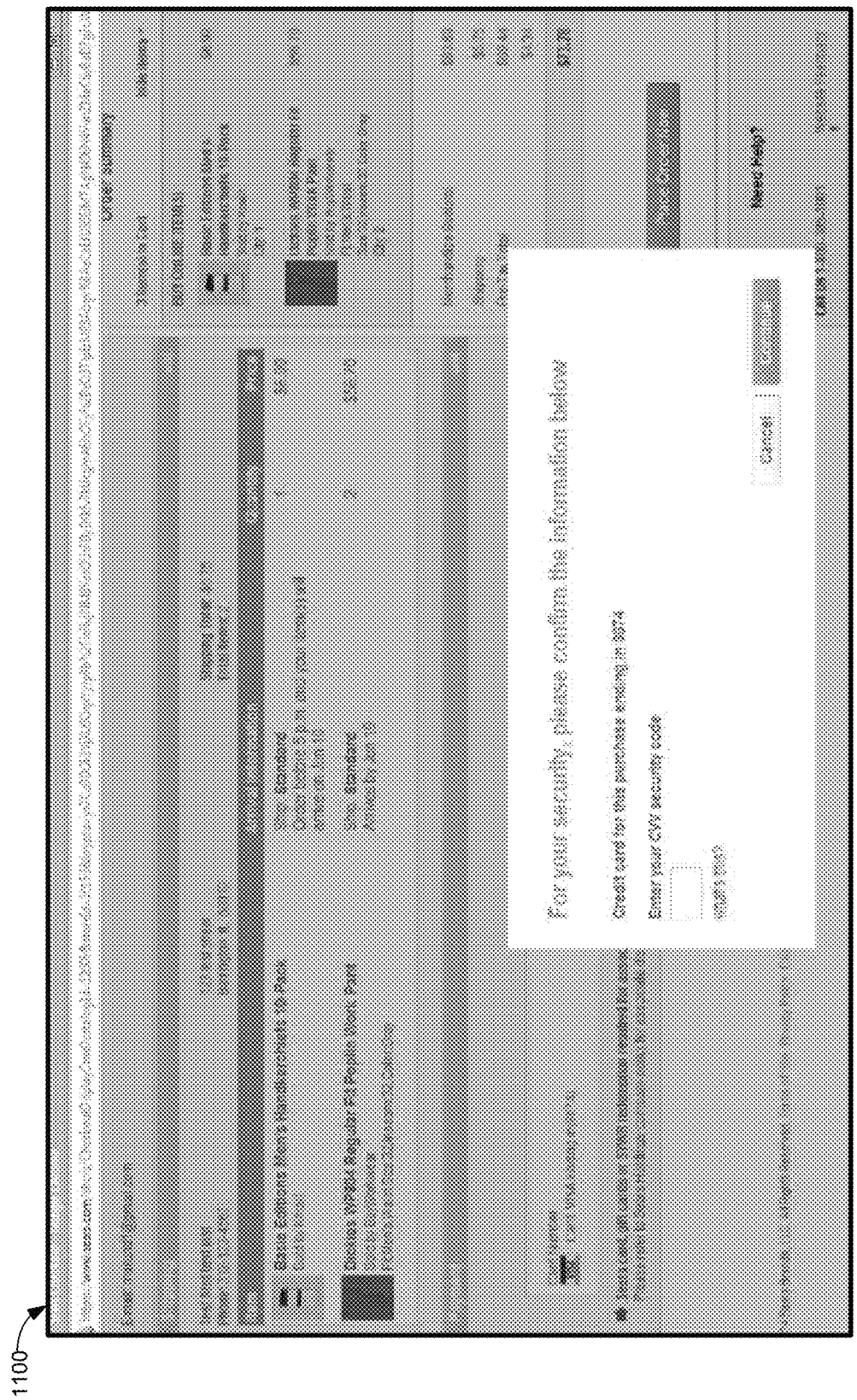
FIG. 11 is an illustration of a screen image of an exemplary order review page showing a security pop-up window requiring confirmation of payment means and payment validation code/PIN information, following expiration of a period of time of consumer inactivity since the prior order was placed during this online session, in accordance with the present disclosure.

FIG. 11 is an illustration of a screen image 1100 of an exemplary order review page showing a security pop-up window requiring confirmation of payment means and payment validation code/PIN information, following expiration of a period of time of consumer inactivity since the prior order was placed during this online session, in accordance with the present disclosure.

Figure 12:
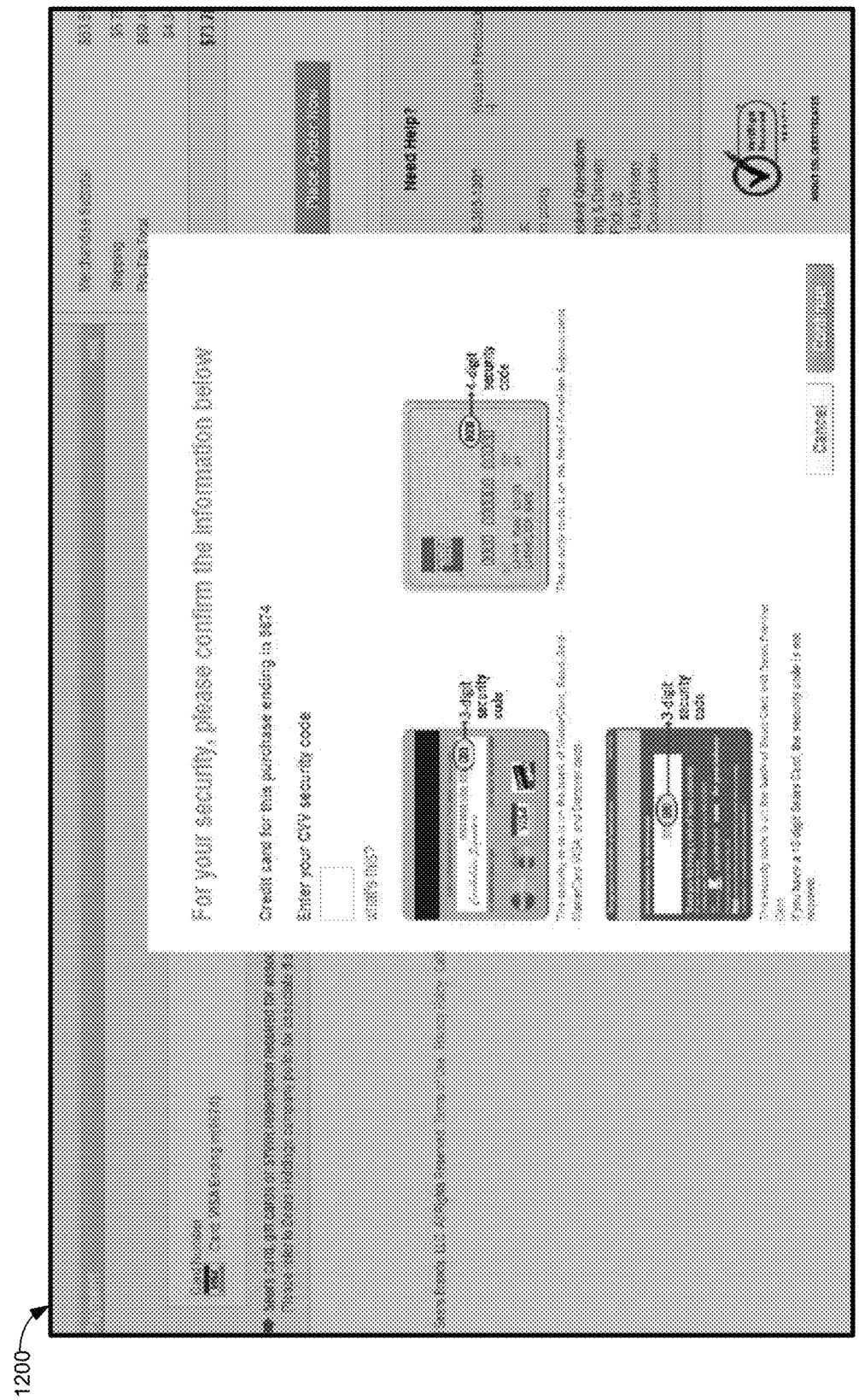
FIG. 12 is an illustration of a screen image of an exemplary order review page showing a security pop-up window requiring confirmation of payment means and payment validation code/PIN information, following expiration of a period of time of consumer inactivity since the prior order was placed during this online session, in accordance with the present disclosure.

FIG. 12 is an illustration of a screen image 1200 of an exemplary order review page showing a security pop-up window requiring confirmation of payment means and payment validation code/PIN information, following expiration of a period of time of consumer inactivity since the prior order was placed during this online session, in accordance with the present disclosure. In the example of FIG. 12, the user is provided with helpful information on how to find the payment validation code/PIN on the payment card of choice.

Figure 13:
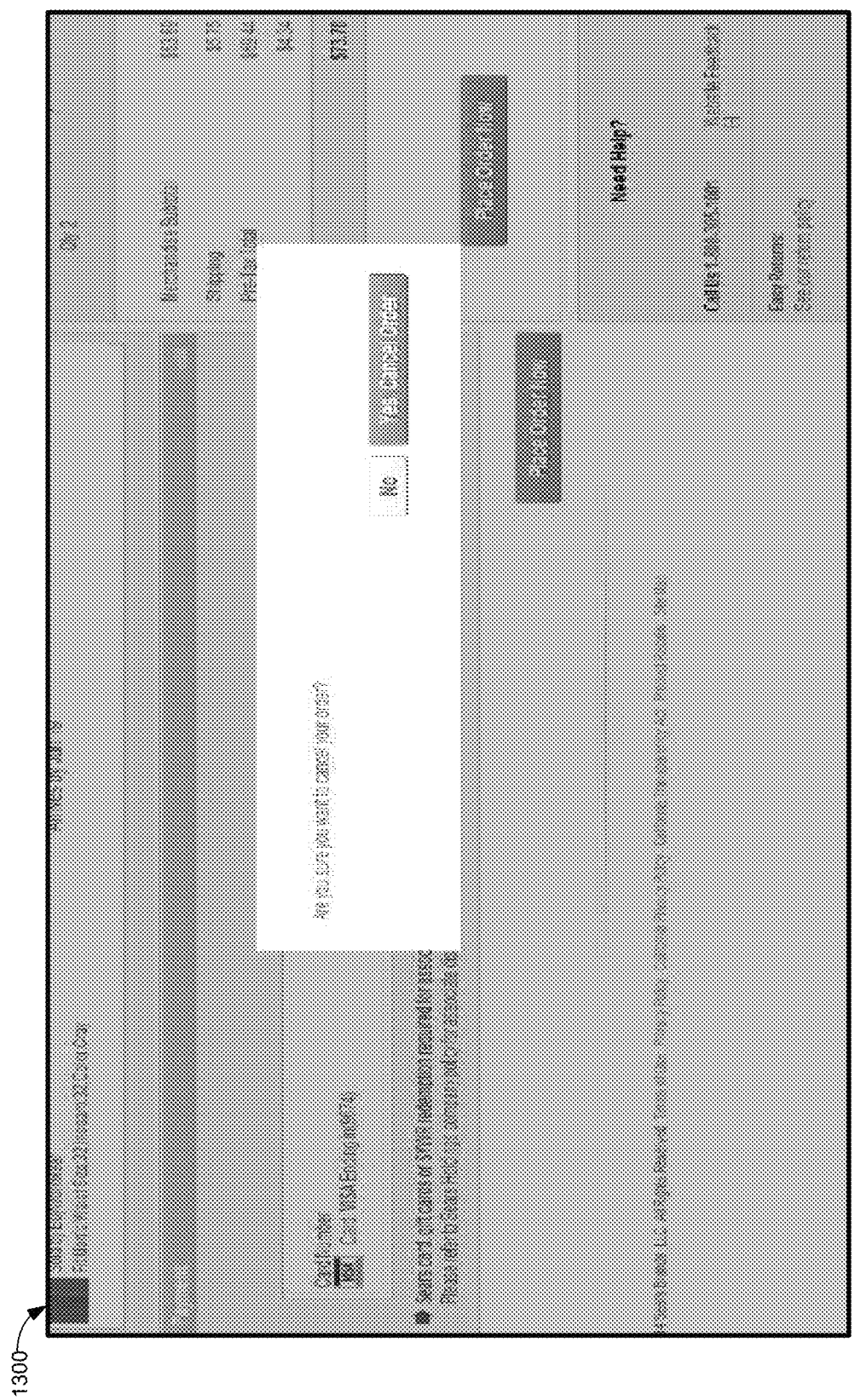
FIG. 13 is an illustration of a screen image of an exemplary order review page showing a pop-up window requesting confirmation of a user request to cancel the current order, in accordance with the present disclosure.

FIG. 13 is an illustration of a screen image 1300 of an exemplary order review page showing a pop-up window requesting confirmation of a user request to cancel the current order, in accordance with the present disclosure.

Figure 14:
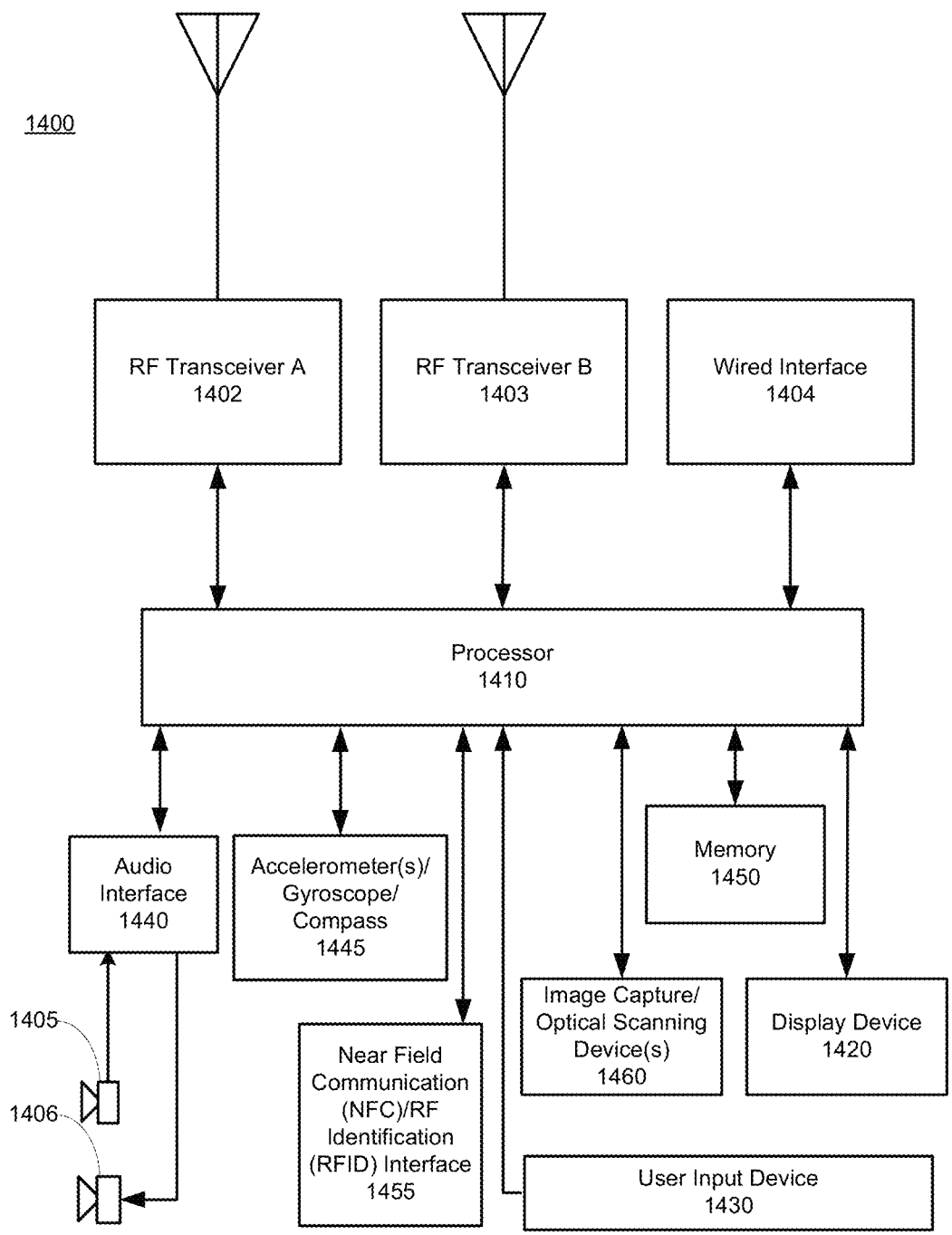
FIG. 14 is a block diagram illustrating a personal electronic device that may correspond, for example, to electronic devices shown in FIG. 1, in accordance with a representative embodiment of the present disclosure.

FIG. 14 is a block diagram illustrating a personal electronic device 1400 that may correspond, for example, to electronic devices 20', 20', 20" shown in FIG. 1, in accordance with a representative embodiment of the present disclosure. The personal electronic device 1400 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 14, the personal electronic device 1400 includes a processor 1410, an RF transceiver A 1402, an RF transceiver B 1403, a wired interface 1404, a display device 1420, a user input device 1430, an audio interface 1440, and a memory 1450. The processor 1410 may be, for example, a suitable microprocessor or microcomputer having sufficient computing power to control the personal electronic device 1400, and is operably coupled to the RF transceiver A 1402, the RF transceiver B 1403, and the wired interface 1404. The RF transceiver A 1402 and RF transceiver B 1403 may comprise any necessary circuitry, logic, and software/firmware for wireless communication over any of, for example, the cellular, Bluetooth, Wi-Fi (e.g., IEEE 802.11a/b/g/n/ac), Zigbee, WiMAX, or any other wireless network known now or in the future. The wired interface 1404 may comprise any necessary circuitry, logic, and software/firmware for wired communication over any of, for example, an Ethernet, Universal Serial Bus, FireWire (IEEE 1394) or other wired networks known now or in the future.

The processor 1410 is also operably coupled to the memory 1450, and may be used for non-transitory storage of executable program instructions, parameters, and data for any of the circuitry of the personal electronic device 1400. The display device 1420 is also operably coupled to the processor 1410, and may comprise, for example, one or more LED, OLED, LCD, or other form of visual display capable of presenting text or graphics, and may comprise any circuitry, logic, or software/firmware to support, for example, a graphical user interface (GUI). The user input device 1430 may comprise, for example, suitable switches, buttons, or touch sensitive surfaces to enable user control and operation of the personal electronic device 1400, and may comprise any necessary circuitry, logic, and software/firmware to allow it to perform those functions. In a representative embodiment of the present disclosure, the user input device 1430 may be a touch sensitive surface at the viewing side of the display device 1420, enabling a user to use the touch sensitive surface of the display device to enter user inputs and respond to displayed information. The audio interface 1440 comprises any necessary circuitry, logic, and software to interface a microphone 1405 and a speaker 1406 to the processor 1410.

Aspects of the present disclosure may be seen in a method of operating a system for using personal information of a consumer to identify and recommend product items for purchase following placement of a prior order. Such a method may comprise, in a computer system configured to communicatively couple with communication devices of a plurality of consumers, for each of the plurality of consumers, maintaining corresponding personal information comprising shopping behavior information, purchase history information, order fulfillment information, and means of payment information. The method may comprise, in response to a specific request of one of the plurality of consumers, adding one or more product items to a first order for the one of the plurality of consumers; and responsive to an explicit request to place the first order of the one of the plurality of consumers, selecting a first set of product items from a plurality of additional product items according to a respective value assigned to each of the plurality of additional product items, wherein the value assigned to each of the plurality of additional product items is representative of a likelihood of purchase of the respective product item by the one of the plurality of consumers.

A method in accordance with the present disclosure may also comprise communicating product information for each of the first set of product items to a communication device of the one of the plurality of consumers, for display; and responsive to the one of the plurality of consumers, processing at least one of the first set of product items as a second order for the one of the plurality of consumers, according to one or both of order fulfillment information and means of payment information for the one of the plurality of consumers. The selecting may comprise analyzing the personal information corresponding to the one of the plurality of consumers to assign the value corresponding to each of a plurality of additional product items. The selecting may also comprise analyzing the personal information of others of the plurality of consumers to determine a level of similarity with the one of the plurality of consumers.

In some representative embodiments of the present disclosure, the second order may be processed according to one or both of the order fulfillment information and the means of payment information chosen by the one of the plurality of consumers for the first order. Processing the second order may comprise updating the personal information of the one of the plurality of consumers according to the first order, and communicating product information for each of a second set of product items to the communication device of the one of the plurality of consumers, for display. Communicating product information for each of the second set of product items may comprise analyzing the personal information corresponding to the one of the plurality of consumers to assign a respective value to each of a second plurality of additional product items, where the value assigned to each of the second plurality of additional product items is representative of a likelihood of purchase of the respective product item by the one of the plurality of consumers. Communicating product information for each of the second set of product items may also comprise selecting the second set of product items from the second plurality of additional product items, according to the values assigned to each of the second plurality of additional product items. The method may use a shopping cart model.

Additional aspects of the present disclosure may be found in a non-transitory computer readable medium having stored thereon a plurality of instructions executable by at least one processor of a computer system configured to communicatively couple with communication devices of a plurality of consumers. In such an embodiment, the plurality of instructions may cause the at least one processor to perform the actions of a method of operating a system for using personal information of a consumer to identify and recommend product items for purchase following placement of a prior order, and the actions may comprise those of the method described above.

Yet other aspects of the present disclosure may be observed in a system for using personal information of a consumer to identify and recommend product items for purchase following placement of a prior order. Such a system may comprise at least one processor for communicatively coupling with communication devices of a plurality of consumers, and the at least one processor may be operable to, at least, perform the actions of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a computer system configured to communicatively couple with communication devices of a plurality of consumers,
for each of the plurality of consumers, maintaining corresponding personal information comprising shopping behavior information, purchase history information, order fulfillment information, and payment information;
providing a digital graphical user interface comprising representations of one or more product items and one or more corresponding graphical elements operable to add the one or more product items to a virtual shopping cart, for display on a communication device of one of the plurality of consumers;
responsive to one or more selections of the one or more graphical elements of the graphical user interface from the one of the plurality of consumers, adding one or more corresponding product items to the virtual shopping cart as a first order for the one of the plurality of consumers;
providing a digital graphical user interface for display on the communication device comprising a graphical element operable to select a delivery mechanism for the first order and a graphical element operable to select a payment mechanism for the first order;
receiving a selection of a delivery mechanism for the first order and a selection of a payment mechanism for the first order;
providing a digital graphical user interface for display on the communication device comprising a graphical element operable to place the first order, a selection of the graphical element operable to place the first order indicating a desire to complete a purchase of the product items in the virtual shopping cart using the selected delivery mechanism and the selected payment mechanism;
responsive to a selection of the graphical element operable to place the first order, (i) placing the first order, (ii) displaying an order confirmation interface confirming completion of the purchase of the product items in the virtual shopping cart, (iii) starting an activity timer, and (iv) selecting a first set of product items from a plurality of additional product items based at least in part on the selected delivery mechanism, the selected payment mechanism, and a comparison of one or more categories relating to the first set of product items and one or categories of interest associated with the one of the plurality of consumers,
providing a digital graphical user interface for display on the communication device comprising representations of the selected first set of product items, one or more corresponding graphical elements operable to add the one or more product items to a virtual shopping cart as a second order, and a graphical element operable to initiate an express check out for the second order, wherein the delivery mechanism can be changed if any of the first set of product items is not eligible for the delivery mechanism associated with the express check out;
determining that the activity timer has expired;
responsive to the determination that the activity timer has expired, requesting that the payment mechanism used to place the first order be validated by providing a graphical user interface that pops up and that comprises an input field requiring the one of the plurality of customers to re-enter a credit card security code, but without re-entering a credit card number; and
responsive to a selection of the graphical user interface to initiate an express checkout for one or more selected products items from the first set of product items as an express purchase, processing at least one of the selected products items from first set of product items as a second order according to the selected delivery mechanism and the selected payment mechanism used to place the first order.

2. The method according to claim 1, comprising:
displaying the first set of product items based on a profit margin for each respective product item.

3. The method according to claim 1, wherein the selected delivery mechanism is ship-to-store delivery, and wherein the selected first set of product items from the plurality of additional product items comprises product items that are available for ship-to-store delivery which was used for the first placed order.

4. The method according to claim 1, wherein the selected delivery mechanism is pick-up-at-store delivery, and wherein the selected first set of product items from the plurality of additional product items comprises product items that are available for pick-up-at store delivery which was used for the first placed order.

5. The method according to claim 1, wherein processing the second order comprises:
updating the personal information of the one of the plurality of consumers according to the first order; and
communicating product information for each of a second set of product items to the communication device of the one of the plurality of consumers, for display.

6. The method according to claim 1, wherein the selected delivery mechanism is air delivery, and wherein the selected first set of product items from the plurality of additional product items comprises product items that are available for air delivery which was used for the first placed order.

7. A non-transitory computer readable medium having stored thereon a plurality of instructions executable by at least one processor of a computer system configured to communicatively couple with communication devices of a plurality of consumers, the plurality of instructions to cause the at least one processor to perform the actions of a method of operating a system for using personal information of a consumer to identify and recommend product items for purchase following placement of a prior order, the actions comprising:
for each of the plurality of consumers, maintaining corresponding personal information comprising shopping behavior information, purchase history information, order fulfillment information, and payment information;
providing a digital graphical user interface comprising representations of one or more product items and one or more corresponding graphical elements operable to add the one or more product items to a virtual shopping cart, for display on a communication device of one of the plurality of consumers;

responsive to one or more selections of the one or more graphical elements of the graphical user interface from the one of the plurality of consumers, adding one or more corresponding product items to the virtual shopping cart as a first order for the one of the plurality of consumers;

providing a digital graphical user interface for display on the communication device comprising a graphical element operable to select a delivery mechanism for the first order and a graphical element operable to select a payment mechanism for the first order;

receiving a selection of a delivery mechanism for the first order and a selection of a payment mechanism for the first order;

providing a digital graphical user interface for display on the communication device comprising a graphical element operable to place the first order, a selection of the graphical element operable to place the first order indicating a desire to complete a purchase of the product items in the virtual shopping cart using the selected delivery mechanism and the selected payment mechanism;

responsive to a selection of the graphical element operable to place the first order, (i) placing the first order, (ii) displaying an order confirmation interface confirming completion of the purchase of the product items in the virtual shopping cart, (iii) starting an activity timer, and (iv) selecting a first set of product items from a plurality of additional product items based at least in part on the selected delivery mechanism, the selected payment mechanism, and a comparison of one or more categories relating to the first set of product items and one or categories of interest associated with the one of the plurality of consumers, providing a digital graphical user interface for display on the communication device comprising representations of the selected first set of product items, one or more corresponding graphical elements operable to add the one or more product items to a virtual shopping cart as a second order, and a graphical element operable to initiate an express check out for the second order, wherein the delivery mechanism can be changed if any of the first set of product items is not eligible for the delivery mechanism associated with the express check out;

determining that the activity timer has expired;

responsive to the determination that the activity timer has expired, requesting that the payment mechanism used to place the first order be validated by providing a graphical user interface that pops up and that comprises an input field requiring the one of the plurality of customers to re-enter a credit card security code, but without re-entering a credit card number; and responsive to a selection of the graphical user interface to initiate an express checkout for one or more selected products items from the first set of product items as an express purchase, processing at least one of the selected products items from first set of product items as a second order according to the selected delivery mechanism and the selected payment mechanism used to place the first order.

8. The non-transitory computer-readable medium according to claim 7, comprising:
displaying the first set of product items based on a profit margin for each respective product item.

9. The non-transitory computer-readable medium according to claim 7, wherein the selected delivery mechanism is ship-to-store delivery, and wherein the selected first set of product items from the plurality of additional product items comprises product items that are available for ship-to-store delivery which was used for the first placed order.

10. The non-transitory computer-readable medium according to claim 7, wherein the selected delivery mechanism is pick-up-at-store delivery, and wherein the selected first set of product items from the plurality of additional product items comprises product items that are available for pick-up-at-store delivery which was used for the first placed order.

11. The non-transitory computer-readable medium according to claim 7, wherein processing the second order comprises:
updating the personal information of the one of the plurality of consumers according to the first order; and
communicating product information for each of a second set of product items to the communication device of the one of the plurality of consumers, for display.

12. The non-transitory computer-readable medium according to claim 7, wherein the selected delivery mechanism is air delivery, and wherein the selected first set of product items from the plurality of additional product items comprises product items that are available for air delivery which was used for the first placed order.

13. A system, comprising:
at least one processor for communicatively coupling with communication devices of a plurality of consumers, the at least one processor operable to, at least:
for each of the plurality of consumers, maintaining corresponding personal information comprising shopping behavior information, purchase history information, order fulfillment information, and payment information;
providing a digital graphical user interface comprising representations of one or more product items and one or more corresponding graphical elements operable to add the one or more product items to a virtual shopping cart, for display on a communication device of one of the plurality of consumers;
responsive to one or more selections of the one or more graphical elements of the graphical user interface from the one of the plurality of consumers, adding one or more corresponding product items to the virtual shopping cart as a first order for the one of the plurality of consumers;
providing a digital graphical user interface for display on the communication device comprising a graphical element operable to select a delivery mechanism for the first order and a graphical element operable to select a payment mechanism for the first order;
receiving a selection of a delivery mechanism for the first order and a selection of a payment mechanism for the first order;
providing a digital graphical user interface for display on the communication device comprising a graphical element operable to place the first order, a selection of the graphical element operable to place the first order indicating a desire to complete a purchase of the product items in the virtual shopping cart using the selected delivery mechanism and the selected payment mechanism;
responsive to a selection of the graphical element operable to place the first order, (i) placing the first order, (ii) displaying an order confirmation interface confirming completion of the purchase of the product items in the virtual shopping cart, (iii) starting an activity timer, and (iv) selecting a first set of product items from a plurality of additional product items based at least in part on the selected delivery mechanism, the selected payment mechanism, and a comparison of one or more categories relating to the first set of product items and one or categories of interest associated with the one of the plurality of consumers, providing a digital graphical user interface for display on the communication device comprising representations of the selected first set of product items, one or more corresponding graphical elements operable to add the one or more product items to a virtual shopping cart as a second order, and a graphical element operable to initiate an express check out for the second order, wherein the delivery mechanism can be changed if any of the first set of product items is not eligible for the delivery mechanism associated with the express check out;

determining that the activity timer has expired;

responsive to the determination that the activity timer has expired, requesting that the payment mechanism used to place the first order be validated by providing a graphical user interface that pops up and that comprises an input field requiring the one of the plurality of customers to re-enter a credit card security code, but without re-entering a credit card number; and responsive to a selection of the graphical user interface to initiate an express checkout for one or more selected products items from the first set of product items as an express purchase, processing at least one of the selected products items from first set of product items as a second order according to the selected delivery mechanism and the selected payment mechanism used to place the first order.

14. The system according to claim 13, comprising:
displaying the first set of product items based on a profit margin for each respective product item.

15. The system according to claim 13, wherein the selected delivery mechanism is ship-to-store delivery, and wherein the selected first set of product items from the plurality of additional product items comprises product items that are available for ship-to-store delivery which was used for the first placed order.

16. The system according to claim 13, wherein the selected delivery mechanism is pick-up-at-store delivery, and wherein the selected first set of product items from the plurality of additional product items comprises product items that are available for pick-up-at store delivery which was used for the first placed order.

17. The system according to claim 13, wherein processing the second order comprises:
updating the personal information of the one of the plurality of consumers according to the first order; and
communicating product information for each of a second set of product items to the communication device of one of the plurality of consumers, for display.

18. The system according to claim 13, wherein the selected delivery mechanism is air delivery, and wherein the selected first set of product items from the plurality of additional product items comprises product items that are available for air delivery which was used for the first placed order.

* * * * *